(12) United States Patent
Miyashita et al.

(10) Patent No.: US 8,514,682 B2
(45) Date of Patent: Aug. 20, 2013

(54) REPRODUCTION SIGNAL EVALUATION METHOD, REPRODUCTION SIGNAL EVALUATION UNIT, AND OPTICAL DISK DEVICE ADOPTING THE SAME

(75) Inventors: Harumitsu Miyashita, Nara (JP); Yasumori Hino, Nara (JP); Junya Shiraishi, Nagano (JP); Shoei Kobayashi, Kanagawa (JP)

(73) Assignees: Panasonic Corporation, Osaka (JP); Sony Corporation, Tokyo (JP)

( * ) Notice: Subject to any disclaimer, the term of this patent is extended or adjusted under 35 U.S.C. 154(b) by 0 days.

(21) Appl. No.: 13/434,995

(22) Filed: Mar. 30, 2012

(65) Prior Publication Data

US 2012/0201112 A1 Aug. 9, 2012

Related U.S. Application Data

(62) Division of application No. 12/496,096, filed on Jul. 1, 2009, now Pat. No. 8,159,918.

(60) Provisional application No. 61/129,510, filed on Jul. 1, 2008.

(51) Int. Cl.
*G11B 7/00* (2006.01)
(52) U.S. Cl.
USPC .................. 369/53.31; 369/44.32; 369/53.35; 369/59.22; 375/263; 375/341
(58) Field of Classification Search
USPC ..... 369/53.31, 44.32, 53.35, 59.22; 375/341, 375/263
See application file for complete search history.

(56) References Cited

U.S. PATENT DOCUMENTS

| 5,938,791 A | 8/1999 | Narahara |
| 7,006,421 B2 | 2/2006 | Katayama |

(Continued)

FOREIGN PATENT DOCUMENTS

| JP | 2003-51163 | 2/2003 |
| JP | 2003-141823 | 5/2003 |

(Continued)

OTHER PUBLICATIONS

International Search Report issued Aug. 4, 2009 in International (PCT) Application No. PCT/JP2009/003020.

(Continued)

*Primary Examiner* — Joseph Feild
*Assistant Examiner* — Linh N Hoffner
(74) *Attorney, Agent, or Firm* — Wenderoth, Lind & Ponack, L.L.P.

(57) ABSTRACT

A reproduction signal evaluation method evaluates the quality of a reproduction signal reproduced from an information recording medium based on a binary signal generated from the reproduction signal using a PRML signal processing system. A pattern extraction step extracts, from the binary signal, a specific state transition pattern which has the possibility of causing a bit error; a step computes a differential metric based on the binary signal; an extraction step extracts the differential metric which is not greater than a predetermined signal processing threshold; a step determines a mean value of the differential metrics which are not greater than the signal processing threshold and extracted in the extraction step; a standard deviation computing step determines a standard deviation which corresponds to an error rate predicted from the mean value; and an evaluation step evaluates a quality of the reproduction signal using the standard deviation.

5 Claims, 15 Drawing Sheets

(56) References Cited

U.S. PATENT DOCUMENTS

| | | | |
|---|---|---|---|
| 7,139,231 | B2 | 11/2006 | Nagai et al. |
| 7,184,381 | B2 | 2/2007 | Ohkubo et al. |
| 7,403,460 | B2 | 7/2008 | Nagai et al. |
| 7,626,914 | B2 * | 12/2009 | Tonami .................. 369/103 |
| 8,159,918 | B2 * | 4/2012 | Miyashita et al. ......... 369/53.31 |
| 2003/0151988 | A1 | 8/2003 | Katayama |
| 2003/0174622 | A1 | 9/2003 | Nagai et al. |
| 2004/0208101 | A1 | 10/2004 | Ohkubo et al. |
| 2005/0249318 | A1 | 11/2005 | Minemura |
| 2006/0083135 | A1 * | 4/2006 | Minemura ................. 369/47.51 |
| 2006/0193406 | A1 | 8/2006 | Adachi et al. |
| 2006/0280093 | A1 | 12/2006 | Nagai et al. |
| 2007/0014385 | A1 | 1/2007 | Shiraishi |
| 2007/0234188 | A1 | 10/2007 | Shiraishi |

FOREIGN PATENT DOCUMENTS

| | | |
|---|---|---|
| JP | 2003-272304 | 9/2003 |
| JP | 2003-303425 | 10/2003 |
| JP | 2004-213862 | 7/2004 |
| JP | 2004-335079 | 11/2004 |
| JP | 2005-216480 | 8/2005 |
| JP | 2006-286073 | 10/2006 |
| JP | 2007-18622 | 1/2007 |

OTHER PUBLICATIONS

Supplementary European Search Report issued Jun. 24, 2011 in corresponding European Application No. EP 09 77 3166.

Shiraishi et al., "Signal Quality Evaluation Method Over-30-GB Blu ray Discs", Japanese Journal of Applied Physics vol. 45, No. 2B, Feb. 1, 2006, pp. 1066-1070, XP 002631437.

* cited by examiner

REPRODUCTION SIGNAL EVALUATION METHOD, REPRODUCTION SIGNAL EVALUATION UNIT, AND OPTICAL DISK DEVICE ADOPTING THE SAME

This application is a divisional of application Ser. No. 12/496,096, filed Jul. 1, 2009 now U.S. Pat. No. 8,159,918 which claims the benefit of U.S. Provisional Application No. 61/129,510, filed Jul. 1, 2008.

BACKGROUND OF THE INVENTION

1. Field of the Invention

The present invention relates to a reproduction signal evaluation method and reproduction signal evaluation unit using a PRML signal processing system, and an optical disk device adopting the same.

2. Description of the Related Art

Recently the shortest mark length of recording marks have reached the limit for optical resolution, and an increase in inter-symbol interference and deterioration of SNR (Signal Noise Ratio) are becoming obvious as the density of optical disk media increases, therefore the use of a PRML (Partial Response Maximum Likelihood) system as a signal processing method is becoming common.

The PRML system is a technology combining partial response (PR) and maximum likelihood (ML) decoding, and is a known system for selecting a most likely signal sequence from a reproduced waveform, assuming the occurrence of inter-symbol interference. As a result, it is known that decoding performance improves compared with a conventional level decision system (e.g. see Blu-ray Disk Books, Ohmsha Ltd.).

On the other hand, a shift in signal processing systems from a level decision to PRML has resulted in generating some problems in reproduction signal evaluation methods. Jitter, that is a reproduction signal evaluation index, which has been used conventionally, is based on the assumption that signals are processed using a level decision system. This means that in some cases jitter has no correlation with the decoding performance of the PRML system, of which signal processing algorithms are different from the level decision system. Therefore a new index having correlation with the decoding performance of the PRML system has been proposed (e.g. see Japanese Patent Application Laid-Open No. 2003-141823 and Japanese Patent Application Laid-Open No. 2004-213862).

A new index to position shift (edge shift) between a mark and a space, which is critical for recording quality of an optical disk, has also been proposed (e.g. see Japanese Patent Application Laid-Open No. 2004-335079). If a PRML system is used, this index must also be correlated with the performance of the PRML, and must quantitatively express the shift direction and quantity of the edge for each pattern, according to the concept of the PRML system.

If the PRML system is used, this index must also be correlated with the decoding performance of the PRML system, and must quantitatively express the shift direction and quantity of the edge for each pattern according to the concept of the PRML system.

As the density of magnetic disk media increases further, the problem of inter-symbol interference and SNR deterioration becomes more serious. In this case, the system margin can be maintained by using a higher level PRML system (e.g. see Blu-ray Disk Books, Ohmsha Ltd.). In the case of an optical disk medium of which diameter is 12 cm and recording capacity per recording layer is 25 GB. The system margin can be maintained by using a PR1221 ML system, but in the case of a 33.3 GB recording capacity per recording layer, a PR12221 ML system must be used. In this way, it is expected that the tendency to use a higher level PRML system would continue in proportion to the increase in densities of optical disk media.

Japanese Patent Application Laid-Open No. 2003-141823 and No. 2004-213862 disclose using "a differential metric, which is a difference of the reproduction signals between the most likely first state transition sequence and the second most likely second state transition sequence" as the index value.

If there are a plurality of patterns of "a most likely first state transition sequence and second most likely second state transition sequence" which have the possibility of causing an error, these patterns must be statistically processed systematically. This processing method is not disclosed in Japanese Patent Laid-Open No. 2003-141823 and No. 2004-213862. Japanese Patent Application Laid-Open No. 2003-272304 discloses a method for detecting a plurality of patterns of "a differential metric of reproduction signals between the most likely first state transition sequence and the second most likely second state transition sequence" detected in the same manner as in Japanese Patent Application Laid-Open No. 2003-141823 and No. 2004-213862, and the processing of a pattern group. In PR12221 ML signal processing, which is disclosed in Japanese Patent Application Laid-Open No. 2003-272304, there are three types of patterns which easily cause an error (pattern group of merging paths of which Euclidian distance is relatively short). In this pattern group. The pattern generation probability and the number of errors, when the pattern generates errors occur in a pattern, differ depending on the pattern, so according to Japanese Patent Application Laid-Open No. 2003-272304, a standard deviation σ is determined from the distribution of the index values, which are acquired for each pattern, and the errors to be generated are predicted based on the generation probability of the pattern (generation frequency with respect to all parameters) and the number of errors to be generated when the pattern has an error. In Japanese Patent Application Laid-Open No. 2003-272304, a method for assuming the distribution of the acquired index values as a normal distribution and predicting a probability for the index value becoming "0" or less based on the standard deviation σ thereof and variance average value μ, that is, a probability of generation of a bit error, is used as an error prediction method. This, however, is a general method for predicting error generation probability. The method for calculating the predicted error rate according to Japanese Patent Application Laid-Open No. 2003-272304 is characterized in that generation probability is determined for each pattern, the predicted error rate is calculated, and this predicted error rate is used as a guideline of signal quality.

However, with the method according to Japanese Patent Application Laid-Open No. 2003-272304, the error rate cannot be predicted accurately if recording distortion occurs to recording signals. This problem becomes particularly conspicuous when data is recorded by thermal recording, such as the case of an optical disk, since recording distortion tends to be generated by thermal interference. As the density of optical disk increases, space between recording pits decreases even more, and an increase in thermal interference is expected, therefore this problem will be unavoidable in the future. The problem of the predicted error rate calculation method according to Japanese Patent Application Laid-Open No. 2003-272304, which cannot appropriately evaluate the signal quality of signals having recording distortion, will now be described.

FIG. 15 shows an example of frequency distribution of a differential metric of a specific pattern, which is used as a signal index in Japanese Patent Application Laid-Open No. 2003-141823 and No. 2003-272304. Generally speaking, the spread of the distribution of the differential metric is caused by the noise generated in an optical disk. The reproduction noise generated by an optical disk is random, so this distribution usually is a normal distribution. And this differential metric is defined as a "differential metric of the most likely first state transition sequence and second most likely second state transition sequence", and is a distribution of which center is a square of the Euclidean distance between the most likely first state transition sequence and the second most likely second state transition sequence of an ideal signal (hereafter defined as the signal processing threshold). The standard deviation of which center is this signal processing threshold is the index value defined in Japanese Patent Application Laid-Open No. 2003-141823, No. 2004-213862 and No. 2003-272304. The probability of this differential metric becoming 0 or less corresponds to the predicted error rate based on the index value. This predicted error rate can be determined using the inverse function of the cumulative distribution function of this normal distribution.

FIG. 15A is a distribution diagram when no substantial distortion occurred during recording, and FIG. 15B and FIG. 15C show distribution diagrams in a state where recording edges in the recording pits shifted due to thermal interference during recording, and recording distortion occurred. If distortion occurs due to thermal interference, the frequency distribution of the differential metric of a specific pattern becomes a normal distribution of which center value is shifted. This shift of the center position corresponds to the distortion generated by thermal interference. FIG. 15B and FIG. 15C are cases when a predetermined amount of shift occurred in the plus or minus direction from the center of the distribution, and an index value to be determined is the same value for both FIG. 15B and FIG. 15C, and the index value increases since the center of the distribution has shifted. An increase in the index value should mean an increase in the probability of error generation, but errors decrease in the case of FIG. 15C. This is because in the case of FIG. 15B, where the center of the distribution is shifted to the side closer to "0", error generation probability (probability of differential metric becoming 0 or less) increases, but in the case of FIG. 15C, where the center of the distribution is shifted to the plus side, error generation probability decreases. This reversal phenomena is because an error is generated only when the index value based on the differential metric approaches 0, which is the major difference from the jitter of the time axis, that is the index value conventionally used for optical disks. In the case of a conventional jitter of the time axis, errors increase regardless the side, plus or minus, to which the center position of the distribution shifts, therefore the above mentioned problem does not occur.

A problem similar to the above also occurs in the case shown in FIG. 15D. FIG. 15D is a case when the determined distribution of the differential metric is not normal distribution. This occurs when the thermal interference during recording is high, and thermal interference is also received from the recording marks before and after "the most likely first state transition sequence and second most likely second state transition sequence". The thermal interference amount is different depending on the length of the recording marks before and after, and the shift of recording mark positions generates a differential metric distribution where two normal distributions (distribution 1 and distribution 2) overlap. In distribution 2, where there is a shift to the plus side from the signal processing threshold, error generation probability drops, but the index value, which is a standard deviation from the signal processing threshold as the center, increases because of the influence of distribution 2. Just like the case of FIG. 15C, error rate also decreases when the index value increases. In this way, if the prior art reported in Japanese Patent Application Laid-Open No. 2003-141823 and No. 2003-272304 is applied to a high recording density optical disk of which thermal interference is high, the correlation of the index value and error rate worsens.

An idea for solving this problem is disclosed in Japanese Patent Application Laid-Open No. 2003-51163. This is a method of counting a number of differential metrics with which the differential metric, acquired from a predetermined pattern group, which becomes smaller than a predetermined threshold (e.g. half of signal processing threshold). A method for determining a predicted error rate based on this count value is also disclosed. In the case of this method, a side closer to 0 of the differential metric distribution, that is the side which has a possibility of generating an error, is used for the evaluation target, so the above mentioned problems in Japanese Patent Application Laid-Open No. 2003-141823 and No. 2003-272304 do not occur.

But a new problem, mentioned herein below, occurs, since a predetermined threshold is used and a number of differential metrics exceeding this threshold is measured. This problem will be described with reference to FIG. 15E.

FIG. 15E shows an example of counting the differential metrics of the distribution which exceeds the threshold, which is half of the signal processing threshold. The differential metrics less than this threshold are counted, and the ratio of the parameter of pattern generation and the count value is used as the signal index. If it is assumed that the distribution of the differential metric is a normal distribution based on this count value, the probability when the differential metric becomes smaller than 0 can be determined, and the predicted error rate can be calculated. FIG. 15F shows an example when the signal quality is good (signal quality with about an 8% jitter). In such a case, the spread of the distribution of the differential metric becomes narrow, and the number of differential metrics which exceeds the threshold decreases dramatically. In the case of FIG. 15F, only about 0.2%, out of the differential metric distribution, can be measured. This means that a wide area must be measured in order to increase the accuracy of the measurement, which increases the measurement time and diminishes measurement stability. Also if there are defects and scratches generated during manufacture of the disks or if there is dust on a disk surface, the differential metric is generated in an area not greater than the threshold due to this defect (illustrated in FIG. 15F). In such a case, a number of the differential metrics, which exceed the threshold generated in the normal distribution, cannot be counted correctly. An advantage of conventional time axis jitter used for optical disks is that it is not affected by such defects, since standard deviation of measured time fluctuation is used and all the measured data is used. The method disclosed in Japanese Patent Application Laid-Open No. 2003-51163, on the other hand, does not have this advantage of the conventional method based on time axis jitter, which is not affected by the defects, and therefore has a problem when used for the index values of optical disks, which is a system where such defects as scratches and fingerprints easily occur. In order to increase the number of differential metrics to be measured using the method according to Japanese Patent Application Laid-Open No. 2003-51163, the threshold could be increased, but if the threshold is increased, another problem occurs, that is the accuracy of the predicted error rate drops. In an extreme case, if the threshold is increased to half of the Euclidean distance, a number of differential metrics that exceed the threshold becomes half of the number of measured samples, therefore it no longer depends on the spread of distribution, and accurate measurement becomes possible. In this way, in the case of the method according to Japanese Patent Application Laid-Open No. 2003-51163, the value of the threshold must be adjusted in order to maintain constant measurement accuracy depending on the quality of measured signals, and such adjustment is possible if the manner of how distribution spreads is somewhat understood, nonetheless this is a major problem for optical disks, where signal quality changes significantly.

Japanese Patent Application Laid-Open No. 2003-51163 and No. 2003-272304 also disclose a method of using bER predicted by the differential metric as the index, but if this is used as an index value, compatibility with the time axis jitter, which has been used as the signal quality evaluation index of optical disks, is lost, and handling is difficult.

SUMMARY OF THE INVENTION

It is an object of the present invention to provide a signal processing method and reproduction signal evaluation unit suitable for a system using a PRML system, and an optical disk device adopting the same.

In order to achieve the foregoing object, a reproduction signal processing method according to an aspect of the present invention is a reproduction signal evaluation method for evaluating quality of a reproduction signal reproduced from an information recording medium based on a binary signal generated from the reproduction signal using a PRML signal processing system, having: a pattern extraction step of extracting, from the binary signal, a specific state transition pattern which has the possibility of causing a bit error; a differential metric computing step of computing a differential metric, which is a difference of a first metric between an ideal signal of a most likely first state transition sequence corresponding to the binary signal and the reproduction signal, and a second metric between an ideal signal of a second most likely second state transition sequence corresponding to the binary signal and the reproduction signal, based on the binary signal extracted in the pattern extraction step; an extraction step of extracting the differential metric which is not greater than a predetermined signal processing threshold; a mean value computing step of determining an average mean of the differential metrics which is not greater than a predetermined signal processing threshold and extracted in the extraction step; a standard deviation computing step of determining a standard deviation which corresponds to an error rate that is predicted, from the mean value; and an evaluation step of evaluating a quality of the reproduction signal using the standard deviation.

According to the foregoing structure, a standard deviation, which corresponds to an error rate predicted from the mean value of the differential metrics which are not greater than the extracted signal processing threshold, is determined, and the quality of the reproduction signal is evaluated using this standard deviation. It is therefore possible to realize a signal evaluation having very high correlation with the error rate. As a result, a reproduction signal evaluation method, which is suitable for a system using a PRML signal processing system and which can evaluate the quality of reproduction signals of information recording media at high accuracy, can be implemented.

Other objects, characteristics and advantages of the present invention shall be sufficiently clarified by the description herein below. The excellent aspects of the present invention shall be clarified in the following description with reference to the accompanying drawings.

DETAILED DESCRIPTION OF THE INVENTION

Embodiments of the present invention will now be described with reference to the drawings. The following embodiments are examples of carrying out the present invention, and do not limit the technical scope of the present invention.

In a signal evaluation index detection unit of the present embodiment, a PR12221 ML system, which is an example of a PRML system, is used for signal processing of a reproduction system, and RLL (Run Length Limited) codes, such as an RLL (1, 7) code, are used for the recording codes. A PRML system is a signal processing that combines waveform equalization technology for correcting reproduction distortion, which is generated when information is reproduced, and signal processing technology for selecting a most likely data sequence from the reproduction signal which includes data errors, by actively utilizing the redundancy of an equalized waveform.

First signal processing by a PR12221 ML system will be described in brief, with reference to FIG. 3 and FIG. 4.

Figure 3:
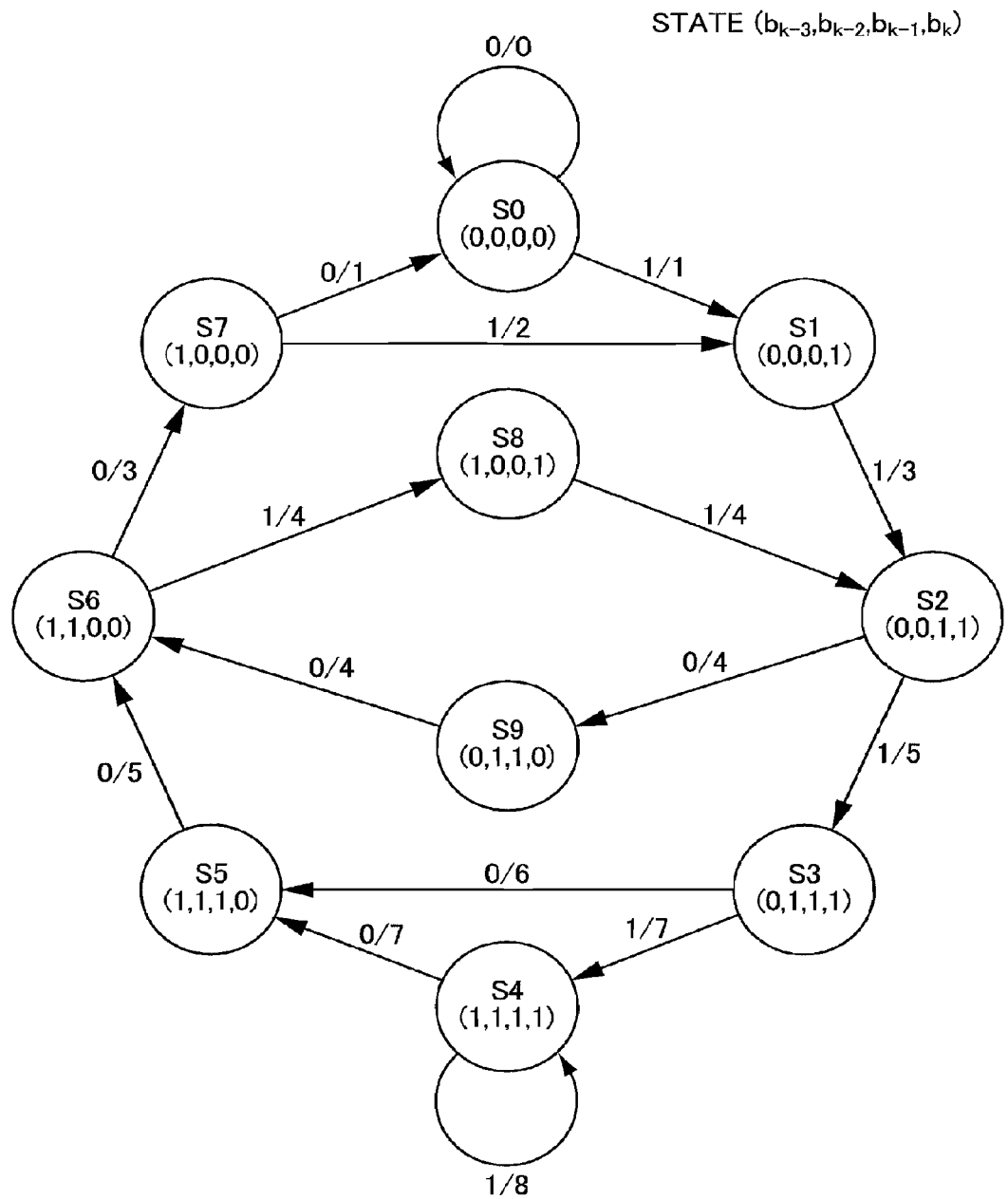
FIG. 3 is a diagram depicting a state transition rule which is determined by an RLL (1, 7) recording code and equalization type PR (1, 2, 2, 2, 1) according to one embodiment of the present invention.

FIG. 3 is a state transition diagram depicting the state transition rule, which is determined by the RLL (1, 7) recording codes and the PR12221 ML system. FIG. 3 shows a state transition diagram which is normally used when PR ML is described. FIG. 4 is a trellis diagram in which the state transition diagram shown in FIG. 3 is developed with respect to the time axis.

"0" or "1" inside the parenthesis in FIG. 3 indicates a signal sequence on the time axis, and indicates the state of possibility of the state transition from the respective state to the next time.

In a PR12221 ML system, a number of states of the decoding unit is limited to 10, because of the combination with the RLL (1, 7) code. A number of state transition paths in a PR12221 ML system is 16, and a number of reproduction levels is 9.

In order to describe the state transition rule of a PR122221 ML system, 10 states are represented, as shown in the state transition diagram in FIG. 3, where the state S(0, 0, 0, 0) at a certain time is S0, the state S(0, 0, 0, 1) is S1, the state S(0, 0, 1, 1,) is S2, the state S(0, 1, 1, 1) is S3, the state S(1, 1, 1, 1) is S4, the state S(1, 1, 1, 0) is S5, the state S(1, 1, 0, 0) is S6, the state S(1, 0, 0, 0) is S7, the state S(1, 0, 0, 1) is S8 and the state S(0, 1, 1, 0) is S9. In FIG. 3, "0" or '1' in parenthesis indicates a signal sequence on the time axis, and shows which state a certain state may possibly become in the state transition the next time.

Figure 4:
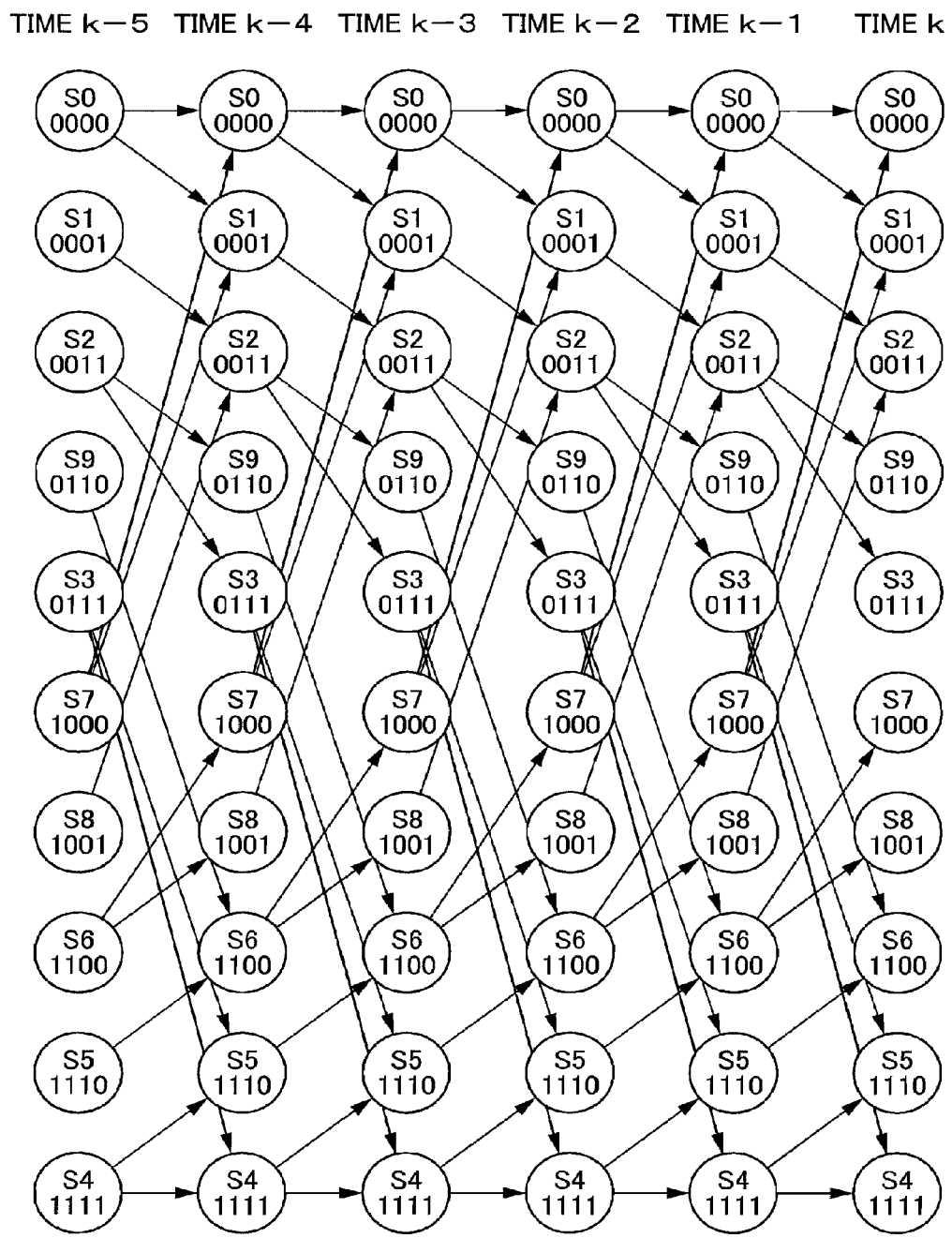
FIG. 4 is a trellis diagram corresponding to the state transition rule shown in FIG. 3.

In the state transition of the PR12221 ML system shown in FIG. 4, there are an infinite number of state transition sequence patterns (combination of states) in which two state transitions can occur when a predetermined state at a certain time transit to a predetermined state at another time. However, patterns which have a high possibility of causing an error are limited to specific patterns of which discernment is difficult. By targeting these state transition patterns in particular which can easily generate an error, the state transition sequence patterns in the PR12221 ML system can be listed as shown in Table 1, Table 2 and Table 3.

TABLE 1

| STATE TRANSITION | TRANSITION DATA SEQUENCE $(b_{k-i}, \ldots, b_k)$ | STATE TRANSITION SEQUENCE |||||||||| PR EQUALIZED IDEAL VALUE ||||| SQUARE OF EUCLIDEAN DISTANCE BETWEEN PATHS |
|---|---|---|---|---|---|---|---|---|---|---|---|---|---|---|---|---|
| | | k−9 | k−8 | k−7 | k−6 | k−5 | k−4 | k−3 | k−2 | k−1 | k | | | | | |
| $S0_{k-5} \to S6_k$ | (0, 0, 0, 0, x, 1, 1, 0, 0) | | | | | S0 | S1 | S2 | S3 | S5 | S6 | 1 | 3 | 5 | 6 | 5 | |
| | | | | | | S0 | S0 | S1 | S2 | S9 | S6 | 0 | 1 | 3 | 4 | 4 | 14 |
| $S0_{k-5} \to S5_k$ | (0, 0, 0, 0, x, 1, 1, 1, 0) | | | | | S0 | S1 | S2 | S3 | S4 | S5 | 1 | 3 | 5 | 7 | 8 | |
| | | | | | | S0 | S0 | S1 | S2 | S3 | S5 | 0 | 1 | 3 | 5 | 7 | 14 |
| $S0_{k-5} \to S4_k$ | (0, 0, 0, 0, x, 1, 1, 1, 1) | | | | | S0 | S1 | S2 | S3 | S4 | S4 | 1 | 3 | 5 | 7 | 8 | |
| | | | | | | S0 | S0 | S1 | S2 | S3 | S4 | 0 | 1 | 3 | 5 | 7 | 14 |
| $S2_{k-5} \to S0_k$ | (0, 0, 1, 1, x, 0, 0, 0, 0) | | | | | S2 | S3 | S5 | S6 | S7 | S0 | 5 | 6 | 5 | 3 | 1 | |
| | | | | | | S2 | S9 | S6 | S7 | S0 | S0 | 4 | 4 | 3 | 1 | 0 | 14 |
| $S2_{k-5} \to S1_k$ | (0, 0, 1, 1, x, 0, 0, 0, 1) | | | | | S2 | S3 | S5 | S6 | S7 | S1 | 5 | 6 | 5 | 3 | 2 | |
| | | | | | | S2 | S9 | S6 | S7 | S0 | S1 | 4 | 4 | 3 | 1 | 1 | 14 |
| $S2_{k-5} \to S2_k$ | (0, 0, 1, 1, x, 0, 0, 1, 1) | | | | | S2 | S3 | S5 | S6 | S8 | S2 | 5 | 6 | 5 | 4 | 4 | |
| | | | | | | S2 | S9 | S6 | S7 | S1 | S2 | 4 | 4 | 3 | 2 | 3 | 14 |
| $S3_{k-5} \to S0_k$ | (0, 1, 1, 1, x, 0, 0, 0, 0) | | | | | S3 | S4 | S5 | S6 | S7 | S0 | 7 | 7 | 5 | 3 | 1 | |
| | | | | | | S3 | S5 | S6 | S7 | S0 | S0 | 6 | 5 | 3 | 1 | 0 | 14 |
| $S3_{k-5} \to S1_k$ | (0, 1, 1, 1, x, 0, 0, 0, 1) | | | | | S3 | S4 | S5 | S6 | S7 | S1 | 7 | 7 | 5 | 3 | 2 | |
| | | | | | | S3 | S5 | S6 | S7 | S0 | S1 | 6 | 5 | 3 | 1 | 1 | 14 |
| $S3_{k-5} \to S2_k$ | (0, 1, 1, 1, x, 0, 0, 1, 1) | | | | | S3 | S4 | S5 | S6 | S8 | S2 | 7 | 7 | 5 | 4 | 4 | |
| | | | | | | S3 | S5 | S6 | S7 | S1 | S2 | 6 | 5 | 3 | 2 | 3 | 14 |
| $S7_{k-5} \to S6_k$ | (1, 0, 0, 0, x, 1, 1, 0, 0) | | | | | S7 | S1 | S2 | S3 | S5 | S6 | 2 | 3 | 5 | 6 | 5 | |
| | | | | | | S7 | S0 | S1 | S2 | S9 | S6 | 1 | 1 | 3 | 4 | 4 | 14 |
| $S7_{k-5} \to S5_k$ | (1, 0, 0, 0, x, 1, 1, 1, 0) | | | | | S7 | S1 | S2 | S3 | S4 | S5 | 2 | 3 | 5 | 7 | 7 | |
| | | | | | | S7 | S0 | S1 | S2 | S3 | S5 | 1 | 1 | 3 | 5 | 6 | 14 |
| $S7_{k-5} \to S4_k$ | (1, 0, 0, 0, x, 1, 1, 1, 1) | | | | | S7 | S1 | S2 | S3 | S4 | S4 | 2 | 3 | 5 | 7 | 8 | |
| | | | | | | S7 | S0 | S1 | S2 | S3 | S4 | 1 | 1 | 3 | 5 | 7 | 14 |
| $S6_{k-5} \to S6_k$ | (1, 1, 0, 0, x, 1, 1, 0, 0) | | | | | S6 | S8 | S2 | S3 | S5 | S6 | 4 | 4 | 5 | 6 | 5 | |
| | | | | | | S6 | S7 | S1 | S2 | S9 | S6 | 3 | 2 | 3 | 4 | 4 | 14 |
| $S6_{k-5} \to S5_k$ | (1, 1, 0, 0, x, 1, 1, 1, 0) | | | | | S6 | S8 | S2 | S3 | S4 | S5 | 4 | 4 | 5 | 7 | 7 | |
| | | | | | | S6 | S7 | S1 | S2 | S3 | S5 | 3 | 2 | 3 | 5 | 6 | 14 |
| $S6_{k-5} \to S4_k$ | (1, 1, 0, 0, x, 1, 1, 1, 1) | | | | | S6 | S8 | S2 | S3 | S4 | S4 | 4 | 4 | 5 | 7 | 8 | |
| | | | | | | S6 | S7 | S1 | S2 | S3 | S4 | 3 | 2 | 3 | 5 | 7 | 14 |
| $S4_{k-5} \to S0_k$ | (1, 1, 1, 1, x, 0, 0, 0, 0) | | | | | S4 | S4 | S5 | S6 | S7 | S0 | 8 | 7 | 5 | 3 | 1 | |
| | | | | | | S4 | S5 | S6 | S7 | S0 | S0 | 7 | 5 | 3 | 1 | 0 | 14 |
| $S4_{k-5} \to S1_k$ | (1, 1, 1, 1, x, 0, 0, 0, 1) | | | | | S4 | S4 | S5 | S6 | S7 | S1 | 8 | 7 | 5 | 3 | 2 | |
| | | | | | | S4 | S5 | S6 | S7 | S0 | S1 | 7 | 5 | 3 | 1 | 1 | 14 |
| $S4_{k-5} \to S2_k$ | (1, 1, 1, 1, x, 0, 0, 1, 1) | | | | | S4 | S4 | S5 | S6 | S8 | S2 | 8 | 7 | 5 | 4 | 4 | |
| | | | | | | S4 | S5 | S6 | S7 | S1 | S2 | 7 | 5 | 3 | 2 | 3 | 14 |

TABLE 2

| STATE TRANSITION | TRANSITION DATA SEQUENCE $(b_{k-i}, \ldots, b_k)$ | STATE TRANSITION SEQUENCE | | | | | | | | | |
|---|---|---|---|---|---|---|---|---|---|---|---|
| | | k − 9 | k − 8 | k − 7 | k − 6 | k − 5 | k − 4 | k − 3 | k − 2 | k − 1 | k |
| $S0_{k-7} \to S0_k$ | (0, 0, 0, 0, x, 1, !x, 0, 0, 0) | | | S0 | S1 | S2 | S9 | S6 | S7 | S0 | S0 |
| | | | | S0 | S0 | S1 | S2 | S9 | S6 | S7 | S0 |
| $S0_{k-7} \to S1_k$ | (0, 0, 0, 0, x, 1, !x, 0, 0, 1) | | | S0 | S1 | S2 | S9 | S6 | S7 | S0 | S1 |
| | | | | S0 | S0 | S1 | S2 | S9 | S6 | S7 | S1 |
| $S0_{k-7} \to S2_k$ | (0, 0, 0, 0, x, 1, !x, 0, 0, 1, 1) | | | S0 | S1 | S2 | S9 | S6 | S7 | S1 | S2 |
| | | | | S0 | S0 | S1 | S2 | S9 | S6 | S8 | S2 |
| $S2_{k-7} \to S6_k$ | (0, 0, 1, 1, x, 0, !x, 1, 1, 0, 0) | | | S2 | S3 | S5 | S6 | S8 | S2 | S9 | S6 |
| | | | | S2 | S9 | S6 | S8 | S2 | S3 | S5 | S6 |
| $S2_{k-7} \to S5_k$ | (0, 0, 1, 1, x, 0, !x, 1, 1, 1, 0) | | | S2 | S3 | S5 | S6 | S8 | S2 | S3 | S5 |
| | | | | S2 | S9 | S6 | S8 | S2 | S3 | S4 | S5 |
| $S2_{k-7} \to S4_k$ | (0, 0, 1, 1, x, 0, !x, 1, 1, 1, 1) | | | S2 | S3 | S5 | S6 | S8 | S2 | S3 | S4 |
| | | | | S2 | S9 | S6 | S8 | S2 | S3 | S4 | S4 |
| $S3_{k-7} \to S6_k$ | (0, 1, 1, 1, x, 0, !x, 1, 1, 0, 0) | | | S3 | S4 | S5 | S6 | S8 | S2 | S9 | S6 |
| | | | | S3 | S5 | S6 | S8 | S2 | S3 | S5 | S6 |
| $S3_{k-7} \to S5_k$ | (0, 1, 1, 1, x, 0, !x, 1, 1, 1, 0) | | | S3 | S4 | S5 | S6 | S8 | S2 | S3 | S5 |
| | | | | S3 | S5 | S6 | S8 | S2 | S3 | S4 | S5 |
| $S3_{k-7} \to S4_k$ | (0, 1, 1, 1, x, 0, !x, 1, 1, 1, 1) | | | S3 | S4 | S5 | S6 | S8 | S2 | S3 | S4 |
| | | | | S3 | S5 | S6 | S8 | S2 | S3 | S4 | S4 |
| $S7_{k-7} \to S0_k$ | (1, 0, 0, 0, x, 1, !x, 0, 0, 0) | | | S7 | S1 | S2 | S9 | S6 | S7 | S0 | S0 |
| | | | | S7 | S0 | S1 | S2 | S9 | S6 | S7 | S0 |
| $S7_{k-7} \to S1_k$ | (1, 0, 0, 0, x, 1, !x, 0, 0, 0, 1) | | | S7 | S1 | S2 | S9 | S6 | S7 | S0 | S1 |
| | | | | S7 | S0 | S1 | S2 | S9 | S6 | S7 | S1 |
| $S7_{k-7} \to S2_k$ | (1, 0, 0, 0, x, 1, !x, 0, 0, 1, 1) | | | S7 | S1 | S2 | S9 | S6 | S7 | S1 | S2 |
| | | | | S7 | S0 | S1 | S2 | S9 | S6 | S8 | S2 |
| $S6_{k-7} \to S0_k$ | (1, 1, 0, 0, x, 1, !x, 0, 0, 0, 0) | | | S6 | S8 | S2 | S9 | S6 | S7 | S0 | S0 |
| | | | | S6 | S7 | S1 | S2 | S9 | S6 | S7 | S0 |
| $S6_{k-7} \to S1_k$ | (1, 1, 0, 0, x, 1, !x, 0, 0, 0, 1) | | | S6 | S8 | S2 | S9 | S6 | S7 | S0 | S1 |
| | | | | S6 | S7 | S1 | S2 | S9 | S6 | S7 | S1 |
| $S6_{k-7} \to S2_k$ | (1, 1, 0, 0, x, 1, !x, 0, 0, 1, 1) | | | S6 | S8 | S2 | S9 | S6 | S7 | S1 | S2 |
| | | | | S6 | S7 | S1 | S2 | S9 | S6 | S8 | S2 |
| $S4_{k-7} \to S6_k$ | (1, 1, 1, 1, x, 0, !x, 1, 1, 0, 0) | | | S4 | S4 | S5 | S6 | S8 | S2 | S9 | S6 |
| | | | | S4 | S5 | S6 | S8 | S2 | S3 | S5 | S6 |
| $S4_{k-7} \to S5_k$ | (1, 1, 1, 1, x, 0, !x, 1, 1, 1, 0) | | | S4 | S4 | S5 | S6 | S8 | S2 | S3 | S5 |
| | | | | S4 | S5 | S6 | S8 | S2 | S3 | S4 | S5 |
| $S4_{k-7} \to S4_k$ | (1, 1, 1, 1, x, 0, !x, 1, 1, 1, 1) | | | S4 | S4 | S5 | S6 | S8 | S2 | S3 | S4 |
| | | | | S4 | S5 | S6 | S8 | S2 | S3 | S4 | S4 |

| STATE TRANSITION | PR EQUALIZED IDEAL VALUE | | | | | | | SQUARE OF EUCLIDEAN DISTANCE BETWEEN PATHS |
|---|---|---|---|---|---|---|---|---|
| $S0_{k-7} \to S0_k$ | 1 | 3 | 4 | 4 | 3 | 1 | 0 | |
| | 0 | 1 | 3 | 4 | 4 | 3 | 1 | 12 |
| $S0_{k-7} \to S1_k$ | 1 | 3 | 4 | 4 | 3 | 1 | 1 | |
| | 0 | 1 | 3 | 4 | 4 | 3 | 2 | 12 |
| $S0_{k-7} \to S2_k$ | 1 | 3 | 4 | 4 | 3 | 2 | 3 | |
| | 0 | 1 | 3 | 4 | 4 | 4 | 4 | 12 |
| $S2_{k-7} \to S6_k$ | 5 | 6 | 5 | 4 | 4 | 4 | 4 | |
| | 4 | 4 | 4 | 4 | 5 | 6 | 5 | 12 |
| $S2_{k-7} \to S5_k$ | 5 | 6 | 5 | 4 | 4 | 5 | 6 | |
| | 4 | 4 | 4 | 4 | 5 | 7 | 7 | 12 |
| $S2_{k-7} \to S4_k$ | 5 | 6 | 5 | 4 | 4 | 5 | 7 | |
| | 4 | 4 | 4 | 4 | 5 | 7 | 8 | 12 |
| $S3_{k-7} \to S6_k$ | 7 | 7 | 5 | 4 | 4 | 4 | 4 | |
| | 6 | 5 | 4 | 4 | 5 | 6 | 5 | 12 |
| $S3_{k-7} \to S5_k$ | 7 | 7 | 5 | 4 | 4 | 5 | 6 | |
| | 6 | 5 | 4 | 4 | 5 | 7 | 7 | 12 |
| $S3_{k-7} \to S4_k$ | 7 | 7 | 5 | 4 | 4 | 5 | 7 | |
| | 6 | 5 | 4 | 4 | 5 | 7 | 8 | 12 |
| $S7_{k-7} \to S0_k$ | 2 | 3 | 4 | 4 | 3 | 1 | 0 | |
| | 1 | 1 | 3 | 4 | 4 | 3 | 1 | 12 |
| $S7_{k-7} \to S1_k$ | 2 | 3 | 4 | 4 | 3 | 1 | 1 | |
| | 1 | 1 | 3 | 4 | 4 | 3 | 2 | 12 |
| $S7_{k-7} \to S2_k$ | 2 | 3 | 4 | 4 | 3 | 2 | 3 | |
| | 1 | 1 | 3 | 4 | 4 | 4 | 4 | 12 |
| $S6_{k-7} \to S0_k$ | 4 | 4 | 4 | 4 | 3 | 1 | 0 | |
| | 3 | 2 | 3 | 4 | 4 | 3 | 1 | 12 |
| $S6_{k-7} \to S1_k$ | 4 | 4 | 4 | 4 | 3 | 1 | 1 | |
| | 3 | 2 | 3 | 4 | 4 | 3 | 2 | 12 |
| $S6_{k-7} \to S2_k$ | 4 | 4 | 4 | 4 | 3 | 2 | 3 | |
| | 3 | 2 | 3 | 4 | 4 | 4 | 4 | 12 |

TABLE 2-continued

| | | | | | | | | |
|---|---|---|---|---|---|---|---|---|
| S4$_{k-7}$→S6$_k$ | 8 | 7 | 5 | 4 | 4 | 4 | 4 | |
| | 7 | 5 | 4 | 4 | 5 | 6 | 5 | 12 |
| S4$_{k-7}$→S5$_k$ | 8 | 7 | 5 | 4 | 4 | 5 | 6 | |
| | 7 | 5 | 4 | 4 | 5 | 7 | 7 | 12 |
| S4$_{k-7}$→S4$_k$ | 8 | 7 | 5 | 4 | 4 | 5 | 7 | |
| | 7 | 5 | 4 | 4 | 5 | 7 | 8 | 12 |

TABLE 3

| STATE TRANSITION | TRANSITION DATA SEQUENCE ($b_{k-i}, \ldots, b_k$) | STATE TRANSITION SEQUENCE | | | | | | | | | |
|---|---|---|---|---|---|---|---|---|---|---|---|
| | | k−9 | k−8 | k−7 | k−6 | k−5 | k−4 | k−3 | k−2 | k−1 | k |
| S0$_{k-9}$→S6$_k$ | (0, 0, 0, 0, x, 1, !x, 0, x, 1, 1, 0, 0) | S0 | S1 | S2 | S9 | S6 | S8 | S2 | S3 | S5 | S6 |
| | | S0 | S0 | S1 | S2 | S9 | S6 | S8 | S2 | S9 | S6 |
| S0$_{k-9}$→S5$_k$ | (0, 0, 0, 0, x, 1, !x, 0, x, 1, 1, 0, 1) | S0 | S1 | S2 | S9 | S6 | S8 | S2 | S3 | S4 | S5 |
| | | S0 | S0 | S1 | S2 | S9 | S6 | S8 | S2 | S3 | S5 |
| S0$_{k-9}$→S4$_k$ | (0, 0, 0, 0, x, 1, !x, 0, x, 1, 1, 1, 1) | S0 | S1 | S2 | S9 | S6 | S8 | S2 | S3 | S4 | S4 |
| | | S0 | S0 | S1 | S2 | S9 | S6 | S8 | S2 | S3 | S4 |
| S2$_{k-7}$→S0$_k$ | (0, 0, 1, 1, x, 0, !x, 1, x, 0, 0, 0, 0) | S2 | S3 | S5 | S6 | S8 | S2 | S9 | S6 | S7 | S0 |
| | | S2 | S9 | S6 | S8 | S2 | S9 | S6 | S7 | S0 | S0 |
| S2$_{k-7}$→S1$_k$ | (0, 0, 1, 1, x, 0, !x, 1, x, 0, 0, 0, 1) | S2 | S3 | S5 | S6 | S8 | S2 | S9 | S6 | S7 | S1 |
| | | S2 | S9 | S6 | S8 | S2 | S9 | S6 | S7 | S0 | S1 |
| S2$_{k-7}$→S2$_k$ | (0, 0, 1, 1, x, 0, !x, 1, x, 0, 0, 1, 1) | S2 | S3 | S5 | S6 | S8 | S2 | S9 | S6 | S8 | S2 |
| | | S2 | S9 | S6 | S8 | S2 | S9 | S6 | S7 | S1 | S2 |
| S3$_{k-5}$→S0$_k$ | (0, 1, 1, 1, x, 0, !x, 1, x, 0, 0, 0, 0) | S3 | S4 | S5 | S6 | S8 | S2 | S9 | S6 | S7 | S0 |
| | | S3 | S5 | S6 | S8 | S2 | S9 | S6 | S7 | S0 | S0 |
| S3$_{k-5}$→S1$_k$ | (0, 1, 1, 1, x, 0, !x, 1, x, 0, 0, 0, 1) | S3 | S4 | S5 | S6 | S8 | S2 | S9 | S6 | S7 | S1 |
| | | S3 | S5 | S6 | S8 | S2 | S9 | S6 | S7 | S0 | S1 |
| S3$_{k-5}$→S2$_k$ | (0, 1, 1, 1, x, 0, !x, 1, x, 0, 0, 1, 1) | S3 | S4 | S5 | S6 | S8 | S2 | S9 | S6 | S8 | S2 |
| | | S3 | S5 | S6 | S8 | S2 | S9 | S6 | S7 | S1 | S2 |
| S7$_{k-5}$→S2$_k$ | (1, 0, 0, 0, x, 1, !x, 0, x, 1, 1, 0, 0) | S7 | S1 | S2 | S9 | S6 | S8 | S2 | S3 | S5 | S6 |
| | | S7 | S0 | S1 | S2 | S9 | S6 | S8 | S2 | S9 | S6 |
| S7$_{k-5}$→S2$_k$ | (1, 0, 0, 0, x, 1, !x, 0, x, 1, 1, 1, 0) | S7 | S1 | S2 | S9 | S6 | S8 | S2 | S3 | S4 | S5 |
| | | S7 | S0 | S1 | S2 | S9 | S6 | S8 | S2 | S3 | S5 |
| S7$_{k-5}$→S2$_k$ | (1, 0, 0, 0, x, 1, !x, 0, x, 1, 1, 1, 1) | S7 | S1 | S2 | S9 | S6 | S8 | S2 | S3 | S4 | S4 |
| | | S7 | S0 | S1 | S2 | S9 | S6 | S8 | S2 | S3 | S4 |
| S6$_{k-5}$→S6$_k$ | (1, 1, 0, 0, x, 1, !x, 0, x, 1, 1, 0, 0) | S6 | S8 | S2 | S9 | S6 | S8 | S2 | S3 | S5 | S6 |
| | | S6 | S7 | S1 | S2 | S9 | S6 | S8 | S2 | S9 | S6 |
| S6$_{k-5}$→S5$_k$ | (1, 1, 0, 0, x, 1, !x, 0, x, 1, 1, 1, 0) | S6 | S8 | S2 | S9 | S6 | S8 | S2 | S3 | S4 | S5 |
| | | S6 | S7 | S1 | S2 | S9 | S6 | S8 | S2 | S3 | S5 |
| S6$_{k-5}$→S4$_k$ | (1, 1, 0, 0, x, 1, !x, 0, x, 1, 1, 1, 1) | S6 | S8 | S2 | S9 | S6 | S8 | S2 | S3 | S4 | S4 |
| | | S6 | S7 | S1 | S2 | S9 | S6 | S8 | S2 | S3 | S4 |
| S4$_{k-5}$→S0$_k$ | (1, 1, 1, 1, x, 0, !x, 1, x, 0, 0, 0, 0) | S4 | S4 | S5 | S6 | S8 | S2 | S9 | S6 | S7 | S0 |
| | | S4 | S5 | S6 | S8 | S2 | S9 | S6 | S7 | S0 | S0 |
| S4$_{k-5}$→S1$_k$ | (1, 1, 1, 1, x, 0, !x, 1, x, 0, 0, 0, 1) | S4 | S4 | S5 | S6 | S8 | S2 | S9 | S6 | S7 | S1 |
| | | S4 | S5 | S6 | S8 | S2 | S9 | S6 | S7 | S0 | S1 |
| S4$_{k-5}$→S2$_k$ | (1, 1, 1, 1, x, 0, !x, 1, x, 0, 0, 1, 1) | S4 | S4 | S5 | S6 | S8 | S2 | S9 | S6 | S8 | S2 |
| | | S4 | S5 | S6 | S8 | S2 | S9 | S6 | S7 | S1 | S2 |

| STATE TRANSITION | PR EQUALIZED IDEAL VALUE | | | | | | | | SQUARE OF EUCLIDEAN DISTANCE BETWEEN PATHS |
|---|---|---|---|---|---|---|---|---|---|
| S0$_{k-9}$→S6$_k$ | 1 | 3 | 4 | 4 | 4 | 4 | 5 | 6 | 5 | |
| | 0 | 1 | 3 | 4 | 4 | 4 | 4 | 4 | 4 | 12 |
| S0$_{k-9}$→S5$_k$ | 1 | 3 | 4 | 4 | 4 | 4 | 5 | 7 | 7 | |
| | 0 | 1 | 3 | 4 | 4 | 4 | 4 | 5 | 6 | 12 |
| S0$_{k-9}$→S4$_k$ | 1 | 3 | 4 | 4 | 4 | 5 | 7 | 8 | | |
| | 0 | 1 | 3 | 4 | 4 | 4 | 4 | 5 | 7 | 12 |
| S2$_{k-7}$→S0$_k$ | 5 | 6 | 5 | 4 | 4 | 4 | 3 | 1 | | |
| | 4 | 4 | 4 | 4 | 4 | 3 | 1 | 0 | | 12 |
| S2$_{k-7}$→S1$_k$ | 5 | 6 | 5 | 4 | 4 | 4 | 3 | 2 | | |
| | 4 | 4 | 4 | 4 | 4 | 3 | 1 | 1 | | 12 |
| S2$_{k-7}$→S2$_k$ | 5 | 6 | 5 | 4 | 4 | 4 | 4 | 4 | | |
| | 4 | 4 | 4 | 4 | 4 | 3 | 2 | 3 | | 12 |
| S3$_{k-5}$→S0$_k$ | 7 | 7 | 5 | 4 | 4 | 4 | 3 | 1 | | |
| | 6 | 5 | 4 | 4 | 4 | 3 | 1 | 0 | | 12 |
| S3$_{k-5}$→S1$_k$ | 7 | 7 | 5 | 4 | 4 | 4 | 3 | 2 | | |
| | 6 | 5 | 4 | 4 | 4 | 3 | 1 | 1 | | 12 |
| S3$_{k-5}$→S2$_k$ | 7 | 7 | 5 | 4 | 4 | 4 | 4 | 4 | | |
| | 6 | 5 | 4 | 4 | 4 | 3 | 2 | 3 | | 12 |
| S7$_{k-5}$→S2$_k$ | 2 | 3 | 4 | 4 | 4 | 5 | 6 | 5 | | |
| | 1 | 1 | 3 | 4 | 4 | 4 | 4 | 4 | | 12 |

TABLE 3-continued

| | | | | | | | | | | |
|---|---|---|---|---|---|---|---|---|---|---|
| $S7_{k-5} \to S2_k$ | 2 | 3 | 4 | 4 | 4 | 4 | 5 | 7 | 7 | |
| | 1 | 1 | 3 | 4 | 4 | 4 | 4 | 5 | 6 | 12 |
| $S7_{k-5} \to S2_k$ | 2 | 3 | 4 | 4 | 4 | 4 | 5 | 7 | 8 | |
| | 1 | 1 | 3 | 4 | 4 | 4 | 4 | 5 | 7 | 12 |
| $S6_{k-5} \to S6_k$ | 4 | 4 | 4 | 4 | 4 | 4 | 5 | 6 | 5 | |
| | 3 | 2 | 3 | 4 | 4 | 4 | 4 | 4 | 4 | 12 |
| $S6_{k-5} \to S5_k$ | 4 | 4 | 4 | 4 | 4 | 4 | 5 | 7 | 7 | |
| | 3 | 2 | 3 | 4 | 4 | 4 | 4 | 5 | 6 | 12 |
| $S6_{k-5} \to S4_k$ | 4 | 4 | 4 | 4 | 4 | 4 | 5 | 7 | 8 | |
| | 3 | 2 | 3 | 4 | 4 | 4 | 4 | 5 | 7 | 12 |
| $S4_{k-5} \to S0_k$ | 8 | 7 | 5 | 4 | 4 | 4 | 4 | 3 | 1 | |
| | 7 | 5 | 4 | 4 | 4 | 4 | 3 | 1 | 0 | 12 |
| $S4_{k-5} \to S1_k$ | 8 | 7 | 5 | 4 | 4 | 4 | 4 | 3 | 2 | |
| | 7 | 5 | 4 | 4 | 4 | 4 | 3 | 1 | 1 | 12 |
| $S4_{k-5} \to S2_k$ | 8 | 7 | 5 | 4 | 4 | 4 | 4 | 4 | 4 | |
| | 7 | 5 | 4 | 4 | 4 | 4 | 3 | 2 | 3 | 12 |

In each of the tables, Table 1 to Table 3, shows a state transition to indicate a locus of states which merged from the start state, two possible transition data sequences which underwent state transition, two possible ideal reproduction waveforms which underwent state transition, and a square of the Euclidean distance of the two ideal reproduction waveforms.

The square of the Euclidean distance indicates as sum of the square of the difference of the two ideal reproduction waveforms. When the error possibility of the two reproduction waveforms is judged, two reproduction waveforms can be more easily distinguished if the value of the Euclidean distance is long, therefore a judgment mistake occurs lest frequently. If the value of the Euclidean distance is short, a judgment mistake may more frequently occur, since it is difficult to distinguish the two waveforms having an error possibility. In other words, state transition patterns of which Euclidean distance is long are state transition patterns where an error does not occur very much, and state transition patterns when the Euclidean distance is short are state transition patterns where an error easily occurs.

In each table, the first column shows the state transition $(Sm_{k-9} \to Sn_k)$ where two state transitions, which easily cause an error, branch and merge again. The second column shows the transition data sequence $(b_{k-i}, \ldots, b_k)$ which generates this state transition. X in this state data sequence indicates a bit which has high error generation possibility among this data, and if this state transition is judged as erred, a number of X (also !X in Table 2 and Table 3) is a number of errors. In other words, X in a transition data sequence can be either "0" or "1". One of "0" or "1" corresponds to the most likely first state transition sequence, and the other corresponds to the second most likely second state transition sequence. In Table 2 and Table 3, !X indicates a bit inversion of X.

As described in detail later, each decoding data sequence (binary signal) after a Viterbi decoding section executes decoding processing is compared with the transition data sequences in Table 1 to Table 3 (X indicates "don't care"), and a most likely first state transition sequence having high error possibility and a second most likely second state transition sequence are extracted. The third column shows the first state transition sequence and second state transition sequence. The fourth column shows two ideal reproduction waveforms (PR equalization ideal values) when a respective state transitions completes, and the fifth column shows a square of the Euclidean distance of these two ideal signals (square of Euclidean distance between paths).

Table 1 shows state transition patterns that could take two state transitions, and is state transition patterns in the case when a square of the Euclidean distance is "14". There are 18 types of state transition sequence patterns in the case when a square of the Euclidean distance is 14. The state transition sequence patterns shown in Table 1 correspond to the edge section (switching of a mark and a space) of the waveforms of an optical disk. In other words, the state transition sequence pattern shown in Table 1 is a pattern of a 1-bit shift error at the edge.

Figure 5:
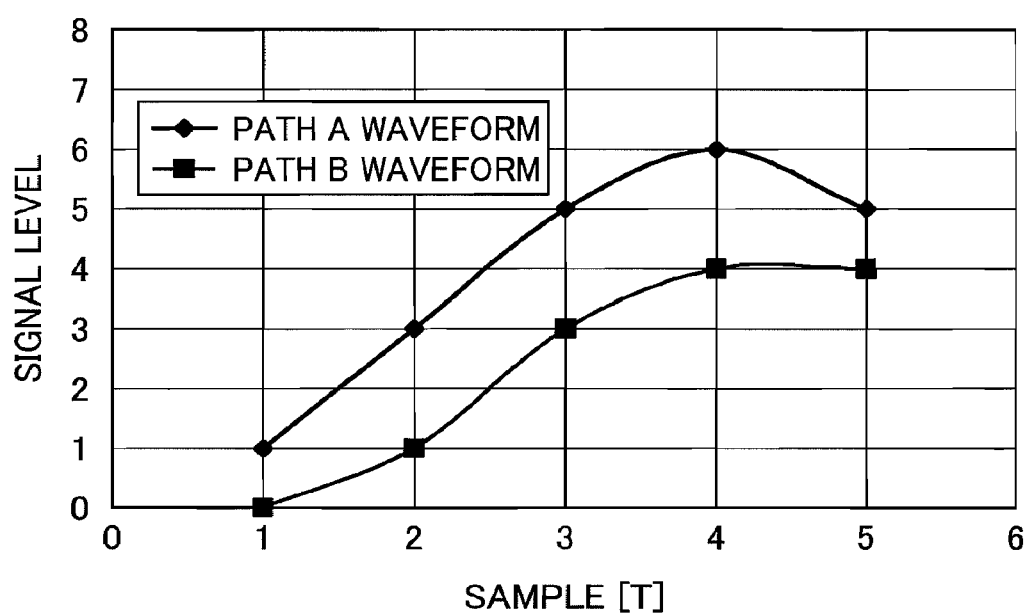
FIG. 5 is a graph depicting a relationship of a sampling time and a reproduction level (signal level) on the transition paths in Table 1.

FIG. 5 is a graph depicting the relationship of the sampling time and a reproduction level (signal level) in the transition paths in Table 1. In the graph in FIG. 5, the x-axis indicates a sampling time (each sampling timing of a recording sequence), and the y-axis indicates a reproduction level. As mentioned above, in the case of a PR12221 ML system, there are 9 levels of ideal reproduction signal levels (levels 0 to 8).

As an example, the transition paths when transiting from the state S0 (k−5) to the state S6 (k) according to the state transition rule shown in FIG. 3 will be described (see Table 1). In this case, one transition path is a case when the recording sequence was detected as a transition of "0, 0, 0, 0, 1, 1, 1, 0, 0". If this transition is converted into a recording state, regarding "0" of the reproduction data as a space portion and "1" as a mark portion, the recording state is 4 T or longer spaces, and 3 T marks and 2 T or longer spaces. In FIG. 5, the relationship of the sampling time and the reproduction level (signal level) in thin transition path is shown as a path A waveform.

The other transition path of the state transition paths from the state S0 (k−5) to the state S6 (k) in the state transition rule in FIG. 5 is a case when the recording sequence is detected as the transition of "0, 0, 0, 0, 0, 1, 1, 0, 0". If "0" of the reproduction data is regarded as a space portion and "1" as a mark portion, the recording state corresponds to 5 T or longer spaces, and 2 T marks and 2 T or longer spaces. In FIG. 5, the PR equivalent ideal waveform of this path is shown as a path B waveform. The state transition pattern of which square of the Euclidean distance is 14 in Table 1 always includes one edge information (zero cross point), which is characteristic thereof.

Figure 6:
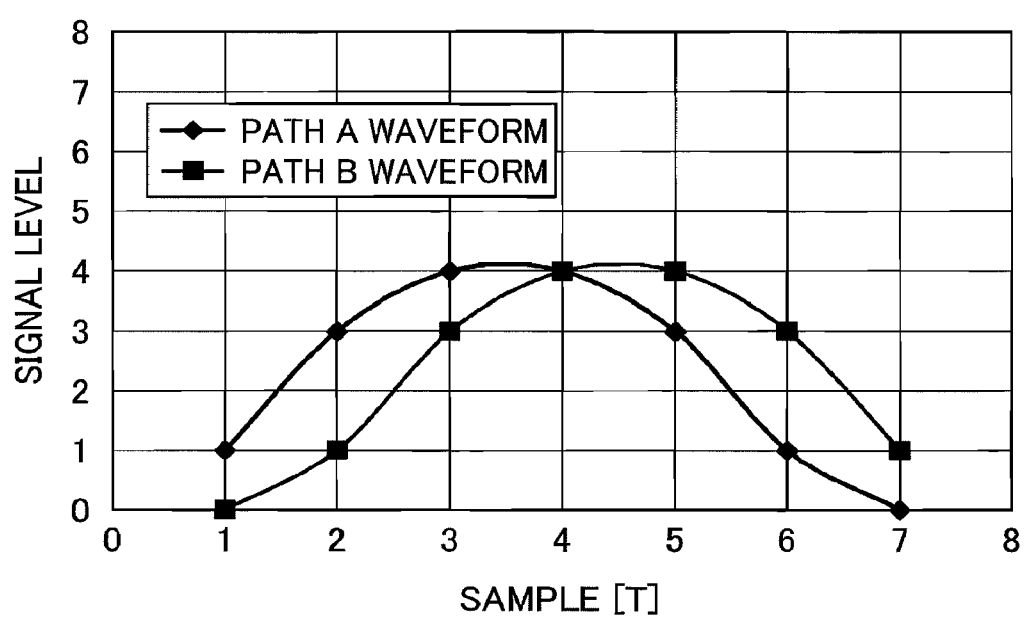
FIG. 6 is a graph depicting a relationship of a sampling time and a reproduction level (signal level) on the transition paths in Table 2.

FIG. 6 is a graph depicting the relationship of the sampling time and the reproduction level (signal level) in the transition paths in Table 2. In the graph in FIG. 6, the x-axis indicates a sampling time (each sampling time of recording sequence), and the y-axis indicates a reproduction level.

Table 2 shows state transition patterns which could take two state transitions, just like Table 1, and shows the state transition patterns in the case when a square of the Euclidean distance is 12. There are 18 types of state transition patterns in the case when a square of the Euclidean distance is 12. The state transition patterns shown in Table 2 are patterns having a 2 T marks or 2 T spaces shift error, that is 2-bit shift error patterns.

In this case, one path of which recording sequence transits as "0, 0, 0, 0, 1, 1, 0, 0, 0, 0, 0" is detected, and if "0" of the reproduction data is regarded as a space portion and "1" as a mark portion, the recording state corresponds to 4 T or longer spaces, and 2 T marks and 5 T or longer spaces. In FIG. 6, the PR equivalent ideal waveform of this path is shown as a path A waveform.

As an example, the transition paths when transiting from the state S0 (k−7) to the state S0 (k) according to the state transition rule shown in FIG. 3 will be described (see Table 2). In this case, one transition path is a case when the recording sequence was detected as a transition of "0, 0, 0, 0, 1, 1, 0, 0, 0, 0, 0". If this transition path is converted into a recording state, regarding "0" as the reproduction data as a space portion and "1" as a mark portion, the recording state corresponds to 4 T or longer spaces, and 2 T marks and 5 T or longer spaces. In FIG. 6, the relationship of the sampling time and the reproduction level (signal level) in this transition path is shown as a path A waveform.

The other transition path, on the other hand, is a case when the recording sequence is detected as the transition of "0, 0, 0, 0, 0, 1, 1, 0, 0, 0, 0". If this transition path is converted into a recording state, regarding "0" of the reproduction data as a space portion and "1" as a mark portion, the recording state corresponds to 5 T or longer spaces, and 2 T marks and 4 T or longer spaces. In FIG. 6, the relationship of the sampling time and the reproduction level (signal level) in this transition path is shown as a path B waveform. The state transition pattern of which square of the Euclidean distance is 12 in Table 2 always includes two edge information, the rise and fall of 2 T, which is characteristic thereof.

Figure 7:
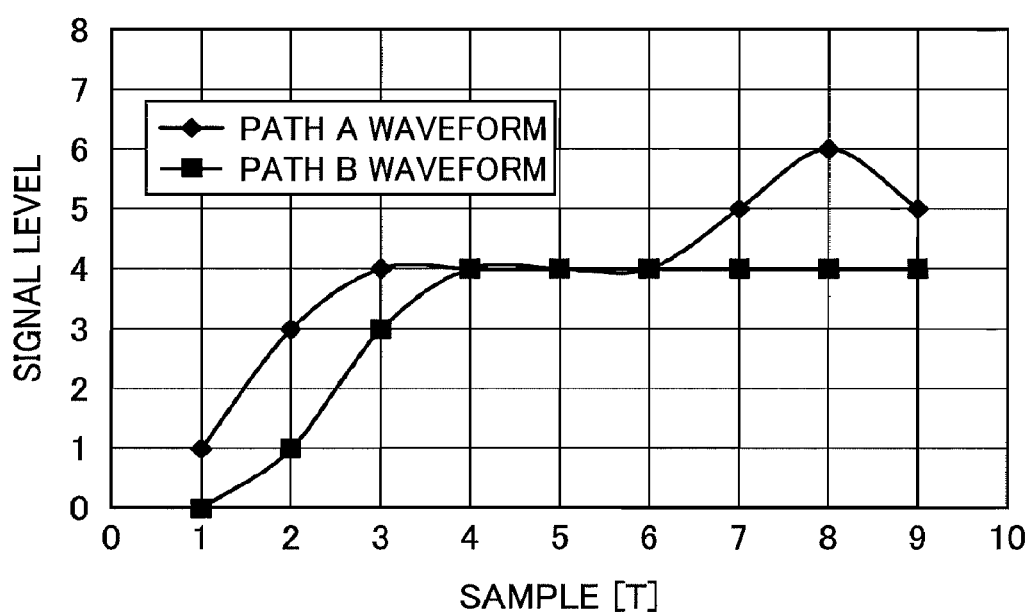
FIG. 7 is a graph depicting a relationship of a sampling time and a reproduction level (signal level) on the transition paths in Table 3.

FIG. 7 is a graph depicting the relationship of the sampling time and the reproduction level (signal level) in the transition paths in Table 3. In the graph in FIG. 7, the x-axis indicates a sampling time (each sampling timing of recording sequence), and the y-axis indicates a reproduction level.

Table 3 shows state transition sequence patterns which could take two state transition sequences, just like Table 1 and Table 2, and shows the state transition sequence patterns in the case when a square of the Euclidean distance is 12. There are 18 types of state transition sequence patterns in the case when a square of Euclidean distance is 12. The state transition sequence patterns shown in Table 3 are areas where 2 T marks and 2 T spaces continue, that is 3-bit shift error patterns.

As an example, the transition paths when transiting from the state S0 (k−9) to the state S6 (k) according to the state transition rule shown in FIG. 3 will be described (see Table 3). In this case, one transition path is a case when the recording sequence was detected as a transition of "0, 0, 0, 0, 1, 1, 0, 0, 1, 1, 1, 0, 0". If this transition path is converted into a recording state, regarding "0" of the reproduction data as a space portion and "1" as a mark portion, the recording state corresponds to 4 T or longer spaces, and 2 T marks, 2 T spaces, 3 T marks and 2 T or longer spaces. In FIG. 7, the relationship of the sampling time and the reproduction level (signal level) in this transition path is shown as a path A waveform.

The other transition path, on the other hand, is a case when the recording sequence is detected as the transition of "0, 0, 0, 0, 0, 1, 1, 0, 0, 1, 1, 0, 0". If this transition path is converted into a recording state, regarding "0" of the reproduction data as a space portion and "1" as a mark portion, the recording state corresponds to 5 T or longer spaces, and 2 T marks, 2 T spaces, 2 T marks and 2 T or longer spaces. In FIG. 7, the relationship of the sampling time and the reproduction level (signal level) in this transition path is shown as a path B waveform. The state transition sequence pattern of which square of the Euclidean distance is 12 in Table 3 always includes at least three edge information, which is characteristic thereof.

Embodiments of the present invention will now be described.

First Embodiment

Figure 1:
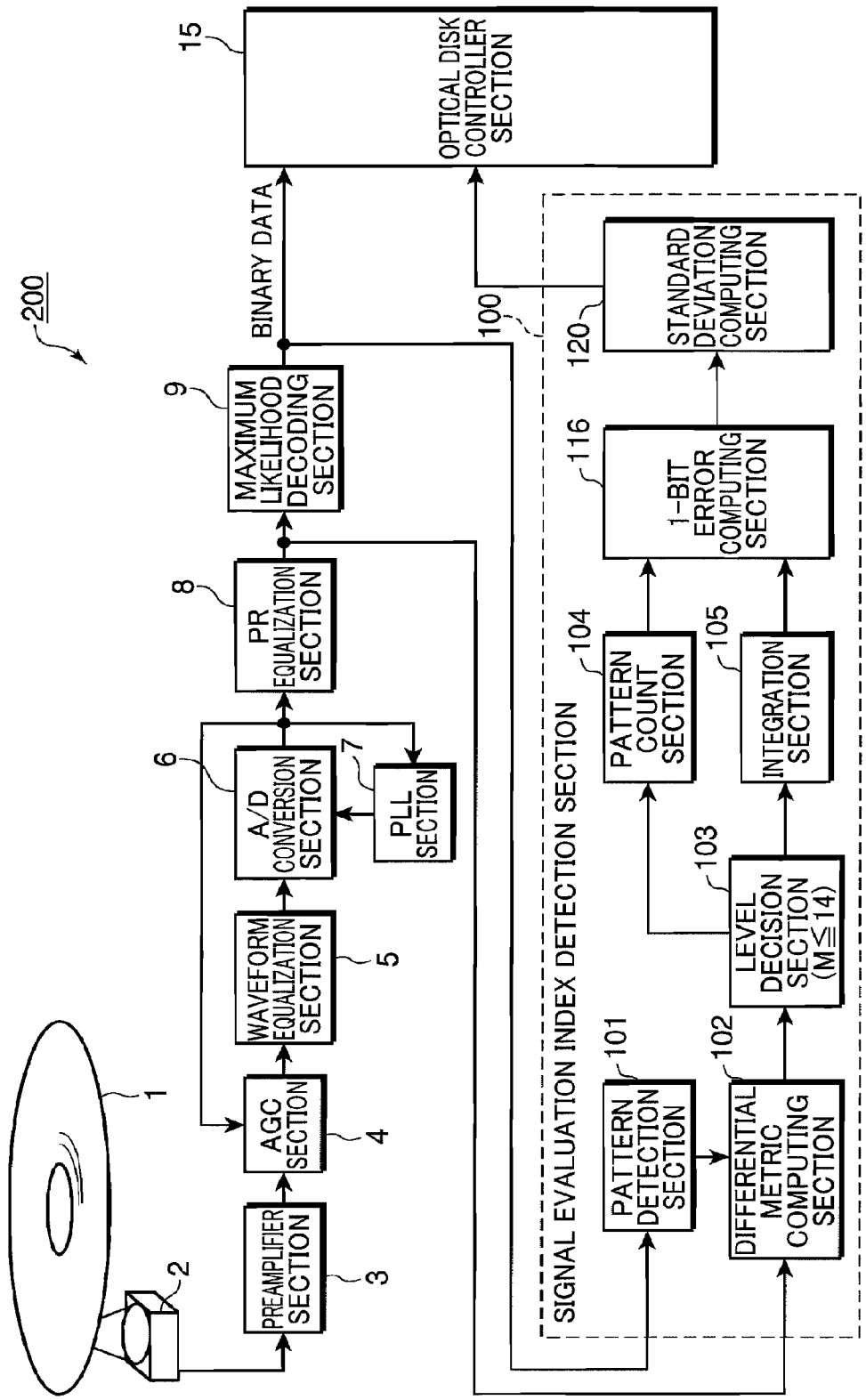
FIG. 1 is a block diagram depicting a general structure of an optical disk device according to one embodiment of the present invention.

An optical disk device having a reproduction signal evaluation unit according to one embodiment of the present invention will now be described with reference to the drawings. FIG. 1 is a block diagram depicting a structure of the optical disk device 200 according to the first embodiment.

An information recording medium 1 is an information recording medium for optically recording/reproducing information, and is an optical disk medium, for example. The optical disk device 200 is a reproduction unit which reproduces information from the installed information recording medium 1.

The optical disk device 200 has an optical head section 2, a preamplifier section 3, an AGC (Automatic Gain Controller) section 4, a waveform equalization section 5, an A/D conversion section 6, a PLL (Phase Locked Loop) section 7, a PR equalization section 8, a maximum likelihood decoding section 9, a signal evaluation index detection section (reproduction signal evaluation unit) 100, and an optical disk controller section 15.

The optical head section 2 converges laser beams transmitted through an objective lens onto a recording layer of the information recording medium 1, receives the reflected light thereof, and generates analog reproduction signals which indicate information read from the information recording medium 1. The preamplifier section 3 amplifies an analog reproduction signal, which is generated by the optical head section 2, using a predetermined gain, and outputs it to the AGC section 4. A numerical aperture of the objective lens is 0.7 to 0.9, and is more preferably 0.85. The wavelength of the laser beam is 410 nm or less, and is more preferably 405 nm.

The preamplifier unit 3 amplifies the analog reproduction signal by a predetermined gain, and outputs it to the AGC section 4.

The AGC section 4 amplifies or attenuates the analog reproduction signal, and outputs it to the waveform equalization section 5 based on the output from the A/D conversion section 6, so that the analog reproduction signal from the preamplifier section 3 has a predetermined amplitude.

The waveform equalization section 5 has LPF characteristics to shield a high frequency area of the reproduction signal, and HPF characteristics to shield a low frequency area of the reproduction signal, and shapes the reproduction waveform according to desired characteristics, and outputs it to the A/D conversion section 6.

The A/D conversion section 6 samples an analog reproduction signal synchronizing with a reproduction clock, which is output from the PLL section 7, converts the analog reproduction signal into a digital reproduction signal, and outputs it to the PR equalization section 8, and also to the AGC section 4 and the PLL section 7.

The PLL section 7 generates a reproduction clock to synchronize with the reproduction signal after waveform equalization, based on the output from the A/D conversion section 6, and outputs it to the A/D conversion section 6.

The PR equalization section 8 has a function to change the filter characteristics into characteristics of various PR systems. The PR equalization section 8 performs filtering to be the frequency characteristics, which is set so that the frequency characteristics of the reproduction system become assumed characteristics of the maximum likelihood decoding section 9 (e.g. PR (1, 2, 2, 2, 1) equalization characteristics), performs PR equalization processing on digital reproduction signals for suppressing high frequency noises, intentionally adding inter-symbol interference, and outputs the results to the maximum likelihood decoding section 9. The PR equalization section 8 may have an FIR (Finite Impulse Response) filter structure, for example, so as to adaptively control the tap coefficient using LMS (The Least-Mean Square) algorithm (see Adaptive Signal Processing Algorithms, Baihukan).

The maximum likelihood decoding unit 9 is a Viterbi decoder, for example, and uses a maximum likelihood decoding system, which estimates a most likely sequence based on a code rule intentionally attached according to the type of partial response. This maximum likelihood decoding section 9 decodes a reproducing signal which was PR-equalized by the PR equalization section 8, and outputs binary data. This binary data is output to the optical disk controller 15 in a subsequent step, as a decoded binary signal, and after execution of predetermined processing, information recorded on the information recording medium 1 is reproduced.

Now a structure of the signal evaluation index detection section 100 according to the present embodiment will be described. The signal evaluation index detection section 100 has a pattern detection section 101, a differential metric computing section 102, a level decision section 103, a pattern count section 104, an integration section 105, an error computing section 116 and a standard deviation computing section 120.

A waveform-shaped digital reproduction signal which is output from the PR equalization section 8, and a binary signal which is output from the maximum likelihood decoding section 9, are input to the signal evaluation index detection section 100. In the signal evaluation index detection section 100, the binary signal is input to the pattern detection section 101, and the digital reproduction signal is input to the differential metric computing section 102, and evaluation processing is executed on digital reproduction signals of the information recording medium 1.

The pattern detection section 101 has a function to extract specific state transition patterns, which have the possibility to cause a bit error, from the binary signal. The pattern detection section 101, according to the present embodiment, extracts specific state transition patterns (state transition patterns shown in Table 1) of which square of the Euclidean distance between an ideal signal of a most likely first state transition sequence and an ideal signal of a second most likely second state transition sequence is 14. In order to implement this, the pattern detection section 101 stores information of the state transition patterns shown in Table 1. And the pattern detection section 101 compares the transition data sequences in Table 1, and the binary signal which is output from the maximum likelihood decoding section 9. As a result of this comparison, if the binary signal matches the transition data sequences in Table 1, this binary signal becomes an extraction target, and the most likely first transition sequence 1 and the second most likely transition sequence 2, corresponding to this binary signal, are selected based on the information in Table 1.

Based on the binary signal extracted by the pattern detection section 101, the differential metric computing section 102 computes a "differential metric" which is an absolute value of a difference of "a first metric between an ideal signal of a most likely transition sequence 1 corresponding to the binary signal (PR equalization ideal value: see Table 1) and the digital reproduction signal" and "a second metric between an ideal signal of a second most likely transition sequence 2 corresponding to the binary signal and the digital reproduction signal". Here the first metric is a square of the Euclidean distance between the ideal signal of the transition sequence 1 and the digital reproduction signal, and the second metric is a square of the Euclidean distance between the ideal signal of the transition sequence 2 and the digital reproduction signal.

The output of the differential metric computing section 102 is input to the level judgment section 103, and is compared with a predetermined value (signal processing threshold). The pattern count section 104 counts a number of differential metrics which are less than the signal processing threshold. Each count value is reflected in a pattern group generation frequency when an error rate is calculated. The integration section 105 integrates the differential metrics which are less than the signal processing threshold. A mean value of the differential metrics which are not greater than the signal processing threshold can be determined by dividing the integration value determined by the integration section 105 by the pattern generation count. The error computing section 116 calculates a predicted error rate based on each integration value of differential metrics which are not greater than the signal processing threshold, and the pattern generation count. The standard deviation computing section 120 computes the standard deviation corresponding to this error rate, and determines this standard deviation as the signal index value to evaluate the signal quality. The process by this signal evaluation index detection section 100 will now be described in detail.

The reproduction signal reproduced from the information recording medium 1 in the PRML processing is output from the maximum likelihood decoding section 9 as a binary signal; as mentioned above, and is input to the signal evaluation index detection section 100. When one of the transition data sequence patterns in Table 1 is detected from this binary signal, the PR equalization ideal values of the state transition sequence 1 and the state transition sequence 2 are determined. For example, if (0, 0, 0, 0, X, 1, 1, 0, 0) is decoded as the binary signal in Table 1, (S0, S1, S2, S3, S5, S6) is selected as the most likely state transition sequence 1, and (S0, S0, S1, S2, S9, S6) is selected as the second most likely state transition sequence 2. The PR equalization ideal value corresponding to the state transition sequence 1 is (1, 3, 5, 6, 5). And the PR equalization ideal value corresponding to the state sequence 2 is (0, 1, 3, 4, 4).

Then the differential metric computing unit 102 determines a first metric ($Pb_{14}$) which is a square of the Euclidean distance between the reproduction signal sequence (digital reproduction signal) and the PR equalization ideal value corresponding to the state transition sequence 1. In the same way, the differential metric computing unit 102 determines a second metric ($Pa_{14}$) which is a square of the Euclidean distance between the reproduction signal sequence and the PR equalization ideal value corresponding to the state transition sequence 2. The differential metric computing unit 102 determines an absolute value of the difference of the first metric ($Pb_{14}$) and the second metric ($Pa_{14}$), as the differential metric $D_{14} = |Pa_{14} - Pb_{14}|$. The computing of $Pb_{14}$ is shown in Expression (1), and the computing of $Pa_{14}$ is shown in Expression (2). In these expressions, $b_k$ denotes the PR equalization ideal value corresponding to the state transition sequence 1, $a_k$ denotes a PR equalization ideal value corresponding to the state transition sequence 2, and $x_k$ denotes a reproduction signal sequence.

$$Pb_{14} = \sum_{k=k-5}^{k} (x_k - b_k)^2 \quad (E1)$$

$$Pa_{14} = \sum_{k=k-5}^{k} (x_k - a_k)^2 \quad (E2)$$

$$D_{14} = |Pa_{14} - Pb_{14}|. \quad (E3)$$

Figure 9:
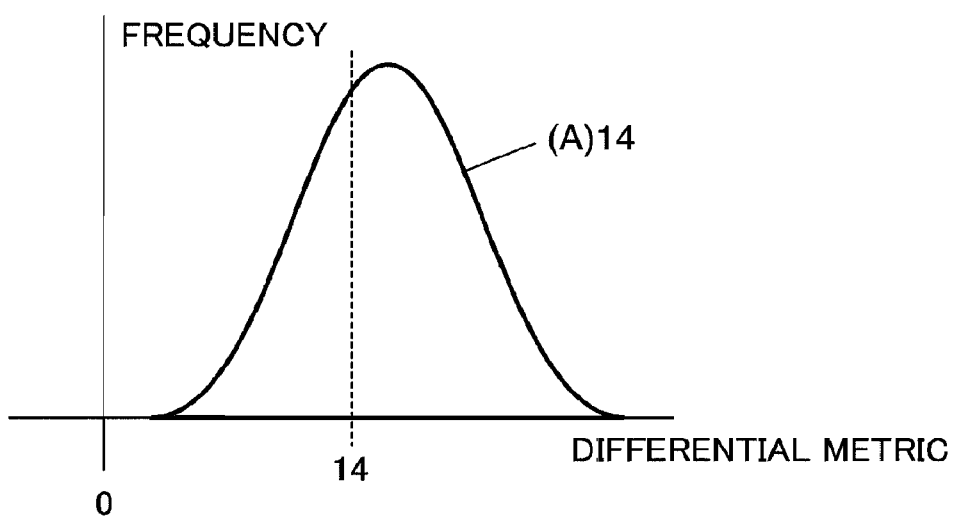
FIG. 9 is a diagram depicting a distribution of the differential metric in a Euclidian distance pattern of a PR (1, 2, 2, 2, 1) ML according to one embodiment of the present invention.

In FIG. 9, an area above the signal processing threshold is an area where error does not occur, and it is therefore unnecessary to predict an error rate. Hence in order to predict an error rate based on the standard deviation of the differential metric, only an area not greater than the signal processing threshold becomes a target. A method for calculating this error rate will now be described.

The differential metric $D_{14}$, which is an output from the differential metric computing section 102, is input to the level decision section 103, and is compared with a predetermined value (signal processing threshold). In the present embodiment, the signal processing threshold according to an extraction target specific state transition pattern is set to "14", which is a square of the Euclidean distance between an ideal signal of the most likely state transition sequence 1 and an ideal signal of the second most likely state transition sequence 2. If the differential metric $D_{14}$ is not greater than the signal processing threshold "14", the level decision section 103 outputs the value of this differential metric $D_{14}$ to the integration section 105, and the pattern count section 104 counts up the count value. The integration section 105 integrates the differential metric cumulatively each time the differential metric $D_{14}$, which is not greater than the signal processing threshold, is input. Then the error computing section 116 calculates a predetermined error date using an integration value of the differential metric not greater than the signal processing threshold and number of generated patterns, counted by the pattern count section 104. Operation of the error computing section 116 will now be described.

The mean value of the differential metrics which are not greater than the signal processing threshold can be determined by dividing the integration value, determined by the integration section 105, by a number of differential metrics less than the signal processing threshold (number of generated patterns), which was counted up by the pattern count section 104. When it is assumed that the mean value of the differential metrics, which are not greater than the signal processing threshold, is M(x), the mean value of the distribution functions is the standard deviation is $\sigma_{14}$, the probability density function is f, and the distribution function is a normal distribution, and the absolute mean value m of the differential metrics, which are less than the signal processing threshold, is given by the following Expression (4).

$$m = |M(X)| \quad (E4)$$

$$= \int_{-\infty}^{\infty} |x - \mu| f(x) dx$$

$$= \frac{1}{\sqrt{2\pi}\sigma_{14}} \left\{ -\int_{-\infty}^{\mu} (x-\mu)e^{-\frac{(x-\mu)^2}{2\sigma_{14}^2}} dx + \int_{\mu}^{\infty} (x-\mu)e^{-\frac{(x-\mu)^2}{2\sigma_{14}^2}} dx \right\}$$

$$= \frac{\sigma_{14}}{\sqrt{2\pi}} \left\{ -\int_{-\infty}^{0} te^{-\frac{t^2}{2}} dt + \int_{0}^{\infty} te^{-\frac{t^2}{2}} dt \right\}$$

-continued $$= \frac{\sigma_{14}}{\sqrt{2\pi}} \left( -\left[-e^{-\frac{t^2}{2}}\right]_{-\infty}^{0} + \left[-e^{-\frac{t^2}{2}}\right]_{0}^{\infty} \right)$$

$$= \frac{\sigma_{14}}{\sqrt{2\pi}} (-(-1) + 1)$$

$$= \sqrt{\frac{2}{\pi}} \sigma_{14}$$

Therefore the relationship of the standard deviation $\sigma_{14}$ of the differential metrics, which are not greater than the signal processing threshold and the absolute mean value m of the differential metrics, which are not greater than the signal processing threshold, is determined by the following Expression (5).

$$m = \sqrt{\frac{2}{\pi}} \sigma_{14} = 0.79788\sigma_{14} \quad (E5)$$

$$\sigma_{14} = \sqrt{\frac{\pi}{2}} m = 1.25331m$$

As Expression (4) and Expression (5) show, in order to determine the standard deviation $\sigma_{14}$ of the differential metrics which are not greater than the signal processing threshold, the absolute mean value m of the differential metrics, which are not greater than the signal processing threshold, is determined, and is then multiplied by about 1.253. Since the signal processing threshold is fixed, the standard deviation $\sigma_{14}$ can be calculated from the absolute mean value m. The probability of error generation (error rate $bER_{14}$), which is computed by the error computing section 116, can be determined by the following Expression (6).

$$bER_{14} = 1 \times p_{14} \times \int_{-\infty}^{0} \frac{1}{\sqrt{2\pi}\sigma_{14}} e^{-\frac{(x-d_{14}^2)^2}{2\sigma_{14}^2}} dx \quad (E6)$$

Here $d_{14}$ in Expression (6) denotes the Euclidean distance between an ideal signal of the most likely state transition sequence 1 in the extraction target state transition patterns, and an ideal signal of the second most likely state transition sequence 2. In the case of the present embodiment, a square of the Euclidean distance $d_{14}^2 = 14$ is used. Therefore if the standard deviation given by Expression (5), which is determined by the integration value and integration count, is $\sigma_{14}$, then the error rate $bER_{14B}$, predicted based on the computing of the error computing section 116, is given by the following Expression (7). $p_{14}$ (=0.4) is an error generation probability in the distribution components with respect to all the channel points. Errors generated in the state transition sequence patterns in Table 1 are 1-bit errors, so the error generation probability has been multiplied by 1.

The standard deviation computing section 120 converts this error rate (error generation probability) $bER_{14}$ into a signal index value M, to make it to an index which can be handled in a similar manner as a jitter. By using Expression (7), the standard deviation computing unit 120 converts $bER_{14}$ into signal index value M using the standard deviation $\sigma$ corresponding to the predicted error rate.

$$bER_{14} = \frac{p_{14}}{2} erfc\left(\frac{1}{2\sqrt{2}\,M}\right) \quad (E7)$$

Here erfc( ) is an integration value of the complementary error function. If the defining expression of the signal index M according to the present embodiment is the following Expression (8), then the index value M using a virtual standard deviation σ can be determined by substituting $bER_{14}$, calculated by Expression (6), in Expression (7).

$$M = \frac{\sigma}{2 \cdot d_{14}^2} \quad (E8)$$

In the above description, a virtual standard deviation σ and signal index value M are calculated from a predicted error rate using Expression (6) to Expression (8).

As described above, according to the present embodiment, the state transition sequence patterns of Merging paths of which Euclidean distance in the PRML signal processing is relatively small are targeted, and the signal evaluation index M is generated based on the differential metric information of the state transition sequence patterns. Specifically, a predicted error rate is calculated from the mean value of the differential metric information which is not greater than the signal processing threshold, then the virtual standard deviation σ is calculated from the error rate, and the signal evaluation index M including this standard deviation σ of the normal distribution is generated. As a result, it is possible to realize a signal evaluation method and evaluation index having very high correlation with the error rate.

In the case of a conventionally proposed distribution evaluation of a simple differential metric, it is difficult to calculate a signal index having correlation with an error rate, because of the recording distortion due to thermal interference generated as a higher density of an optical disk that will be increasingly demanded in the future. The present embodiment is for solving this problem, and a key point thereof is that only one side of the distribution components of the differential metrics, where errors are generated, is targeted to calculate the signal index which has high correlation with actual errors to be generated, and the standard deviation σ of both virtual sides distribution is determined based on this one sided distribution.

According to the present embodiment, for the specific state transition pattern which may cause a bit error, the pattern detection section 101 according to the present embodiment extracts specific state transition patterns (state transition patterns shown in Table 1) with which a square of the Euclidean distance between an ideal signal of the most likely first state transition sequence and an ideal signal of the second most likely second state transition sequence becomes 14, but the present invention is not limited to this. For example, specific state transition patterns (state transition patterns shown in Table 2 or Table 3) with which this square of the Euclidean distance becomes 12 may be extracted.

The optical disk controller unit 15 functions as an evaluation section, which executes evaluation processing based on the signal evaluation index M received from the standard deviation computing section 120. This evaluation result can be displayed on a display section, which is not illustrated, or stored in a memory as evaluation data.

In the present embodiment, the optical disk device 200 having the signal evaluation index detection section 100 was described, but the present invention may be constructed as an optical disk evaluation unit (reproduction signal evaluation unit) having the optical disk controller section 15 as an evaluation section. The optical disk evaluation unit can be used for evaluating the information recording medium before shipment, whether this information recording medium 1 has a quality conforming to a predetermined standard or not.

The optical disk device 200 having the reproduction signal evaluation unit may be arranged to perform the following operation. For example, the quality of the reproduction signal is evaluated for commercial optical disks (blank disks) shipped from a factory, and optical disks which are judged as not satisfying a predetermined quality are rejected. It is for certain possible that optical disks recorded by a recorder (recording using a device other than this optical disk device) can be evaluated by this optical disk device and the optical disk, which are judged as not satisfying a predetermined quality, and are rejected.

If the optical disk device 200 can record and reproduce information, then evaluation based on test recording can be performed before recording information on the optical disk. In this case, the quality of reproduction signals is evaluated for the test information recorded by the optical disk device 200, and if NG, recording conditions are adjusted until NG becomes OK, and the optical disk is rejected if NG continues after a predetermined number of times of adjustment.

Second Embodiment

Figure 2:
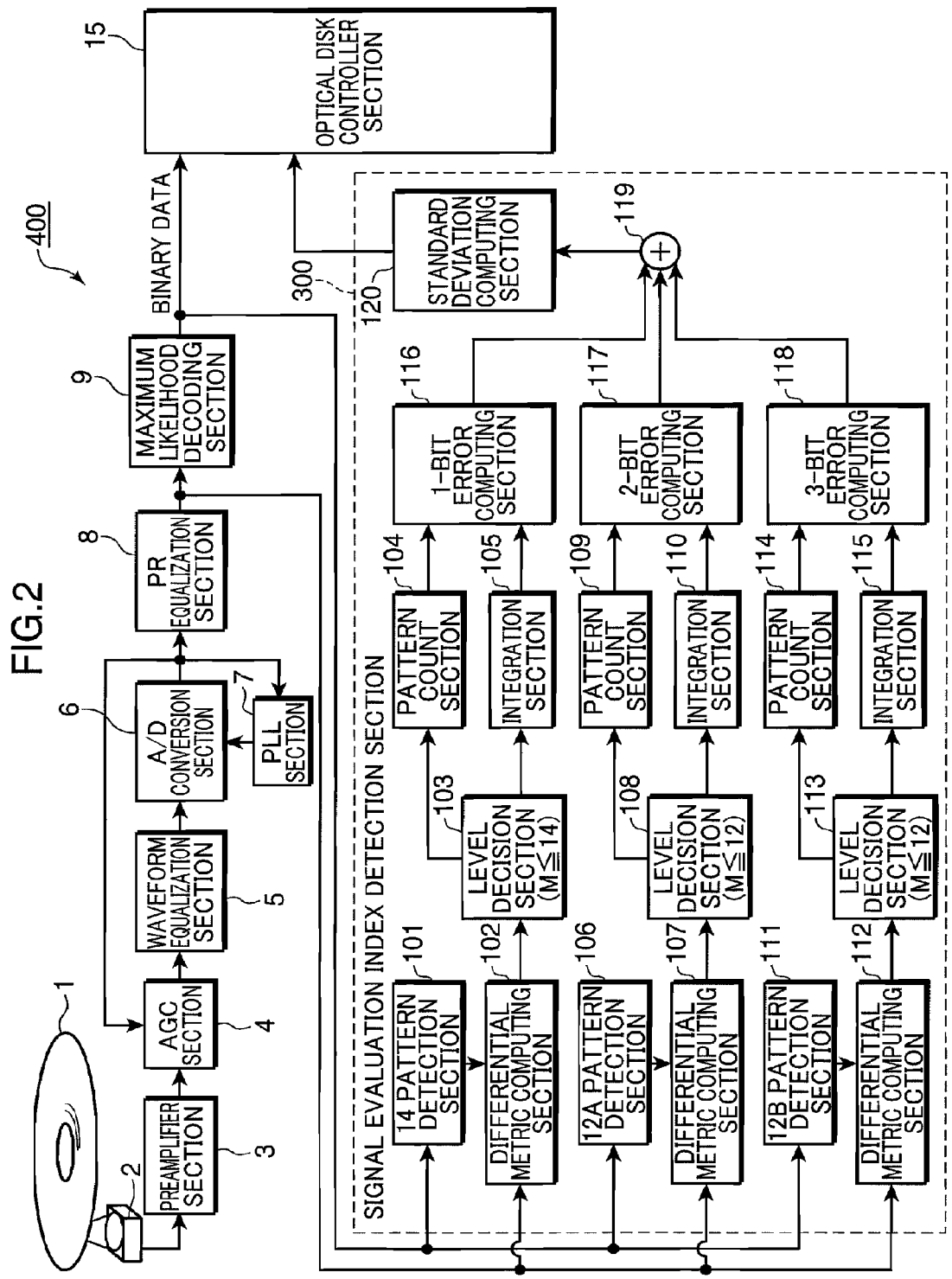
FIG. 2 is a block diagram depicting a general structure of an optical disk device according to another embodiment of the present invention.

An optical disk device having a reproduction signal evaluation unit according to another embodiment of the present invention will now be described with reference to the drawings. A composing element the same as the first embodiment is denoted with a same element number, for which description can be omitted. FIG. 2 is a block diagram depicting the structure of the optical disk device 400 of second embodiment.

An information recording medium 1 is an information recording medium for optically recording/reproducing information, and is an optical disk medium, for example. The optical disk device 400 is a reproduction unit which reproduces information from the installed information recording medium 1.

The optical disk device 400 has an optical head section 2, a pre-amplifier section 3, an AGC (Automatic Gain Controller) section 4, a waveform equalization section 5, an A/D conversion section 6, a PLL (Phase Locked Loop) section 7, a PR equalization section 8, a maximum likelihood decoding section 9, a signal evaluation index detection section (reproduction signal evaluation unit) 300 and an optical disk controller section 15. The structures and functions of these elements constituting the optical disk device 400 are the same as the first embodiment, and descriptions thereof are omitted here.

Now a structure of the signal evaluation index detection section 300 according to the present embodiment will be described. The signal evaluation index detection section 300, just like the signal evaluation index detection section 100 of the first embodiment, can be used as an evaluation unit for judging whether the quality of the information recording medium 1 conforms to a predetermined standard before shipment. The present signal evaluation index detection section 300 may also be installed in a drive unit of the information recording medium 1, and used as an evaluation unit to perform test recording before a user records information on the information recording medium 1.

The signal evaluation index detection section 300 has pattern detection sections 101, 106 and 111, differential metric computing sections 102, 107 and 112, level decision sections 103, 108 and 113, pattern, count sections 104, 109 and 114, integration sections 105, 110 and 115, error computing sections 116, 117 and 118, and a standard deviation computing section 120.

A waveform-shaped digital reproduction signal which is output from the PR equalization section 8, and a binary signal which is output from the maximum likelihood decoding section 9, are input to the signal evaluation index detection section 300. The pattern detection sections 101, 106 and 111 compare the transition data sequences in Tables 1, 2 and 3 and the binary data which is output from the maximum likelihood decoding section 9 respectively. If the binary data matches the transition data sequences in Tables 1, 2 and 3 as a result of comparison, a most likely transition sequence 1 and a second most likely transition sequence 2 are selected based on Table 1, Table 2 and Table 3. And based on the selection results of the pattern detection sections 101, 106 and 111, the differential metric computing sections 102, 107 and 112 compute a metric, which is a distance between an ideal value of a transition sequence (PR equalization ideal value: see Table 1, Table 2 and Table 3) and the digital reproduction signal. Then the differential metric computing sections 102, 107 and 112 compute the difference between the metrics computed from the two transition sequences respectively, and perform the absolute value processing on the metric differences having plus and minus values. The outputs from the differential metric computing sections 102, 107 and 112 are input to the level decision sections 103, 108 and 113 respectively, and are compared with a predetermined value (signal processing threshold). The pattern count sections 104, 109 and 114 count a number of differential metrics which are not greater than the signal processing threshold respectively. These count values each become a pattern generation frequency when an error rate is calculated. The integration sections 105, 110 and 115 integrate the differential metrics which are not greater than the signal processing threshold respectively. The mean value of the differential metrics which are not greater than the signal processing threshold can be determined by dividing the integration value determined by the integration sections 105, 110 or 115 by a number of generated patterns.

Each integration section integrates differential metrics which are not greater than the signal processing threshold, and each computing section divides each integration value by a number of generated patterns, so as to determine a mean value of the differential metrics which are not greater than the signal processing threshold, but each integration section may integrate the differential metrics which are less than the signal processing threshold, and each computing section divides each integration value by a number of generated patterns, so as to determine a mean value of the differential metrics which are less than the signal processing threshold.

The error computing sections 116, 117 and 118 calculate a predicted error rate from each integration value of the differential metrics which are not greater than the signal processing threshold and the number of generated patterns. The error rates calculated by the error computing sections 116, 117 and 118 are added by the adding section 119. The standard deviation corresponding to this error rate is computed by the standard deviation computing section 120, and this becomes the signal index value to evaluate the signal quality. The process by this signal evaluation index detection section 300 will now be described in detail.

The reproduction signal reproduced from the information recording medium 1 in the PRML processing is output from the maximum likelihood decoding section 9 as a binary signal, as mentioned above, and is input to the signal evaluation index detection section 300. When one of the transition data sequence patterns in Table 1 is detected from this binary signal, the PR equalization ideal values of the state transition sequence 1 and the state transition sequence 2 are determined. For example, if (0, 0, 0, 0, X, 1, 1, 0, 0,) is decoded as the binary signal in Table 1, (S0, S1, S2, S3, S5, S6) is selected as the most likely state transition sequence 1, and (S0, S0, S1, S2, S9, S6) is selected as the second most likely state transition sequence 2. The PR equalization ideal value corresponding to the state transition sequence 1 is (1, 3, 5, 6, 5). The PR equalization ideal value corresponding to the state transition sequence 2 is (0, 1, 3, 4, 4).

Then the differential metric computing section 102 determines a first metric ($Pb_{14}$) which is a square of the Euclidean distance between the reproduction signal sequence (digital reproduction signal) and the PR equalization ideal value corresponding to the state transition sequence 1. In the same way, the differential metric computing section 102 determines a second metric ($Pa_{14}$) which is a square of the Euclidean distance between the reproduction signal sequence and the PR equalization ideal value corresponding to the state transition sequence 2. The differential metric computing section 102 determines an absolute value of the difference of the first metric ($Pb_{14}$) and the second metric ($Pb_{14}$), as differential metric $D_{14}=|Pa_{14}-Pb_{14}|$. The computing of $Pb_{14}$ is shown in Expression (9), and the computing of $Pa_{14}$ is shown in Expression (10). In these expressions, $b_k$ denotes a PR equalization ideal value corresponding to the state transition sequence 1, $a_k$ denotes a PR equalization ideal value corresponding to a state transition sequence 2, and $x_k$ denotes a reproduction signal sequence.

$$Pb_{14} = \sum_{k=k-5}^{k} (x_k - b_k)^2 \tag{E9}$$

$$Pa_{14} = \sum_{k=k-5}^{k} (x_k - a_k)^2 \tag{E10}$$

$$D_{14} = |Pa_{14} - Pb_{14}| \tag{E11}$$

In order to determine a signal evaluation index having a high correlation with the error rate, an evaluation method considering all the patterns which have a high possibility of error generation is required in the signal processing based on a PR12221 ML system.

Figure 8:
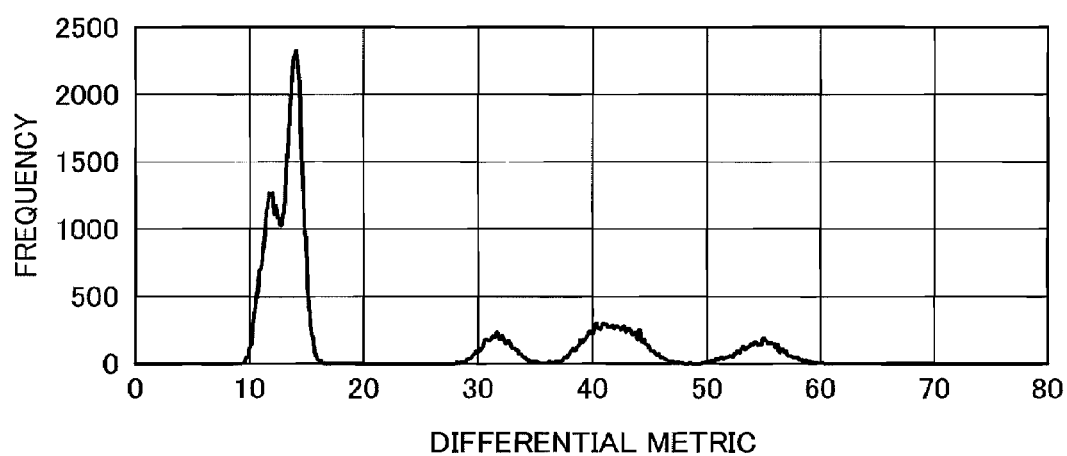
FIG. 8 is a diagram depicting a distribution of the differential metric of the PR (1, 2, 2, 2, 1) ML according to one embodiment of the present invention.

FIG. 8 is a diagram depicting the distribution of differential metrics in the signal processing of the PR 12221 mL system. In FIG. 8, the x-axis indicates a differential metric, and the y-axis indicates a frequency of a predetermined differential metric value. As the differential metric (square of Euclidean distance) becomes smaller in the distribution, the possibility of generating an error is higher in the signal processing based on the PR12221 ML system. As shown in the graph of FIG. 8, the differential metrics have a distribution group in the sections 12 and 14, and differential metrics higher than this are 30 or more. In other words, in order to acquire a signal index having a high correlation with the error rate, it is sufficient to target the differential metrics in the groups 12 and 14. These groups indicate the state transition sequence patterns shown in Table 1, Table 2 and Table 3. And the pattern detection sections 101, 106 and 111 identify these state transition sequence patterns. This operation of the differential metric computing unit, which computes the metric difference from these identified state transition sequence patterns, will be described in more detail.

FIG. 10(A) shows an output frequency distribution of the differential metric computing section 102. The processing of the differential metric computing section 107 is shown in Expression (12) to Expression (14), and the processing of the differential metric computing section 112 is shown in Expression (15) to Expression (17).

$$Pb_{12A} = \sum_{k=k-7}^{k} (x_k - b_k)^2 \quad (E12)$$

$$Pa_{12A} = \sum_{k=k-7}^{k} (x_k - a_k)^2 \quad (E13)$$

$$D_{12A} = |Pa_{12A} - Pb_{12A}| \quad (E14)$$

$$Pb_{12B} = \sum_{k=k-9}^{k} (x_k - b_k)^2 \quad (E15)$$

$$Pa_{12B} = \sum_{k=k-9}^{k} (x_k - a_k)^2 \quad (E16)$$

$$D_{12B} = |Pa_{12B} - Pb_{12B}| \quad (E17)$$

Figure 10:
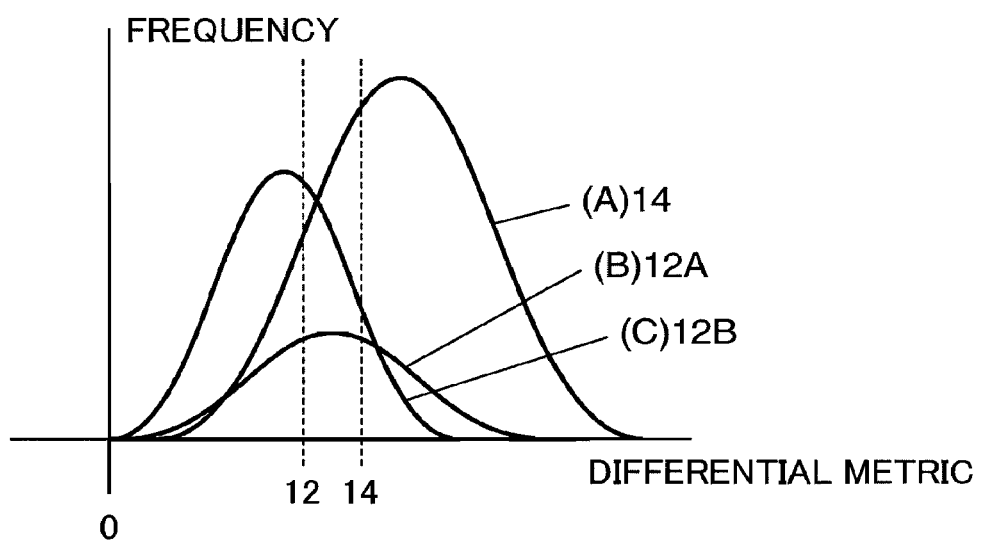
FIG. 10 is a diagram depicting a distribution of the differential metric in each Euclidian distance pattern of a PR (1, 2, 2, 2, 1) ML according to one embodiment of the present invention.

The distributions of (A), (B) and (C) in FIG. 10 have a different frequency and center position respectively. A number of error bits which are generated when each of these patterns cause an error is also different. The patterns in Table 1, where a square of the Euclidean distance is 14, are patterns in which a 1-bit error occurs. The patterns in Table 2, where a square of the Euclidean distance is 12, are patterns in which a 2-bit error occurs, and the patterns in Table 3, where a square of the Euclidean distance is 12, are patterns in which a 3-bit error occurs. The error patterns of which the square of the Euclidean distance is 12, in particular, depends on the number of 2 Ts that continue, and in the case of the recording modulation codes which allow a continuation of 6 units of 2 T, a maximum 6-bit error is generated. Table 3 does not cover a 6-bit error in which 2 T continuously errors, but a pattern to evaluate 2 T continuous errors can be defined according to necessity, so as to extrapolate the evaluation target pattern table.

In the state transition sequence patterns in each table, the error generation probability in the recording modulation code sequence is also different. For example, the error generation frequency is: the state transition sequence patterns in Table 1 are about 40% of all the samples, the patterns in Table 2 are about 15% of all the samples, and the patterns in Table 3 are about 5% of all the samples. In this way, the distributions shown by (A), (B) and (C) in FIG. 10 have different weights in terms of the standard deviation σ which indicates a dispersion, detection window (Euclidean distance), error generation frequency and error bit count, so prediction of the error rate generated by these distributions can also be computed considering these factors. A predicted error rate calculation method, which is a major characteristic of the present application, will be described below.

As described in the above mentioned problem, when a predicted error rate is calculated for each pattern group, the predicted error rate may not be able to be determined appropriately depending on the profile of distribution. Therefore in the present embodiment, the standard deviation σ is calculated from the mean value of a portion of the distribution not greater than a predetermined threshold (signal processing threshold), so as to determine the error rate, whereby calculation accuracy of the predicted error rate is improved.

Figure 11:
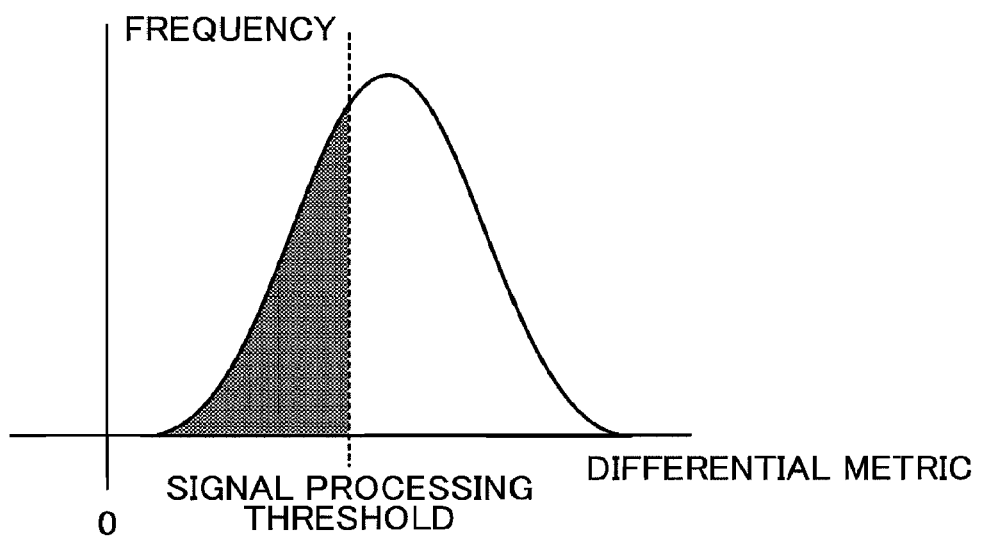
FIG. 11 is a diagram depicting a distribution of the differential metric of a PR (1, 2, 2, 2, 1) ML according to one embodiment of the present invention.

In FIG. 11, the area above the signal processing threshold is an area where an error does not occur, and it is therefore unnecessary to predict an error rate. Therefore in order to predict an error rate from the standard deviation of the differential metrics, an area not greater than the signal processing threshold should be targeted. This error rate calculation method will now be described. $D_{14}$, $D_{12A}$ and $D_{12B}$, which are outputs from the differential metric computing sections 102, 107 and 112, are input to the level decision sections 103, 108 and 113, and are compared with a predetermined value (signal processing threshold) respectively. In the present embodiment, the signal processing threshold is set to 14 for $D_{14}$, and 12 for both $D_{12A}$ and $D_{12B}$. If the differential metric is not greater than the signal processing threshold, the level decision sections 103, 108 and 113 output the value, and increment the count value of the pattern count sections 104, 109 and 114 corresponding to the respective pattern count. At, the same time, the integration sections 105, 110 and 115 integrate the differential metric that is not greater than the signal processing threshold. And the error computing sections 116, 117 and 118 calculate the estimated error rate from the integration value of the differential metrics that are not greater than this signal processing threshold and the number of generated patterns. Operation of these error computing sections 116, 117 and 118 will now be described.

The integration value determined in each integration section 105, 110 and 115 is divided by the number of differential metrics (number of generated patterns) that are not greater than the signal processing threshold, counted by the pattern count section 104, 109 and 114, then a mean value of the differential metrics that is not greater than the signal processing threshold is determined. If it is assumed that the mean value of the differential metrics that are not greater than the signal processing threshold is M(x), a mean value of the distribution functions is μ, the standard deviation is $σ_n$, the probability density function is f, and the distribution functions have a normal distribution, then the absolute mean value m of the differential metrics that are not greater than the signal processing threshold is given by the following Expression (18).

$$\begin{aligned} m &= |M(X)| \quad (E18) \\ &= \int_{-\infty}^{\infty} |x - \mu| f(x)\, dx \\ &= \frac{1}{\sqrt{2\pi}\, \sigma_n} \left\{ -\int_{-\infty}^{\mu} (x - \mu) e^{-\frac{(x-\mu)^2}{2\sigma_n^2}}\, dx + \int_{\mu}^{\infty} (x - \mu) e^{-\frac{(x-\mu)^2}{2\sigma_n^2}}\, dx \right\} \\ &= \frac{\sigma_n}{\sqrt{2\pi}} \left\{ -\int_{-\infty}^{0} t e^{-\frac{t^2}{2}}\, dt + \int_{0}^{\infty} t e^{-\frac{t^2}{2}}\, dt \right\} \\ &= \frac{\sigma_n}{\sqrt{2\pi}} \left( \left[ -e^{-\frac{t^2}{2}} \right]_{-\infty}^{0} + \left[ -e^{-\frac{t^2}{2}} \right]_{0}^{\infty} \right) \\ &\phantom{=}\, \frac{\sigma_n}{\sqrt{2\pi}} (-(-1) + 1) \\ &= \sqrt{\frac{2}{\pi}}\, \sigma_n \end{aligned}$$

Therefore the relationship of the standard deviation $σ_n$ of the differential metrics that are not greater than the signal processing threshold and the absolute mean value m of the differential metrics that are not greater than the signal processing threshold is given by the following Expression (19).

$$m = \sqrt{\frac{2}{\pi}} \sigma_n = 0.79788 \sigma_n \quad \text{(E19)}$$

$$\sigma_n = \sqrt{\frac{\pi}{2}} m = 1.25331 m$$

Hence it is understood from Expression (18) and Expression (19) that in order to calculate the standard deviation $\sigma_n$ of the differential metrics that are not greater than the signal processing threshold, the absolute mean value m of the differential metrics that are not greater than the signal processing threshold is determined, and is then multiplied by about 1.253. Since the signal processing threshold is fixed, the standard deviation $\sigma_n$ can be calculated from the absolute mean value m. Then the probability of error generation (error rate: bER), calculated by the error computing sections 116, 117 and 118 respectively, can be determined by the following Expression (20).

$$bER = p \times \int_{-\infty}^{0} \frac{1}{\sqrt{2\pi} \, \sigma_n} e^{-\frac{(x-d^2)^2}{2\sigma_n^2}} dx \quad \text{(E20)}$$

Here d in Expression (20) denotes a Euclidean distance between an ideal signal of a most likely state transition sequence 1 in the extraction target state transition patterns and an ideal signal of a second most likely state transition sequence 2. In the case of the present embodiment, a square of the Euclidean distance is $d_{14}^2=14$, $d_{12A}^2=12$ and $d_{12B}^2=12$.

Therefore if the standard deviations that are determined from the integration values and integration count by Expression (19) are $\sigma_{14}$, $\sigma_{12A}$ and $\sigma_{12B}$, then the predicted error rates $bER_{14}$, $bER_{12A}$ and $bER_{12B}$, which are computed by the error computing sections 116, 117 and 118 respectively, are given by the following expressions.

$$bER_{14} = 1 \times p_{14} \times \int_{-\infty}^{0} \frac{1}{\sqrt{2\pi} \, \sigma_{14}} e^{-\frac{(x-d_{14}^2)^2}{2\sigma_{14}^2}} dx \quad \text{(E21)}$$

$$bER_{12A} = 2 \times p_{12A} \times \int_{-\infty}^{0} \frac{1}{\sqrt{2\pi} \, \sigma_{12A}} e^{-\frac{(x-d_{12A}^2)^2}{2\sigma_{12A}^2}} dx \quad \text{(E22)}$$

$$bER_{12B} = 3 \times p_{12B} \times \int_{-\infty}^{0} \frac{1}{\sqrt{2\pi} \, \sigma_{12B}} e^{-\frac{(x-d_{12B}^2)^2}{2\sigma_{12B}^2}} dx \quad \text{(E23)}$$

Here $P_{14}$, $P_{12A}$ and $P_{12B}$ (0.4, 0.15, 0.05) are error generation probabilities in the distribution components of all the channel points. An error generated in the state transition sequence patterns in Table 1 is a 1-bit error, so the error generation probability has been multiplied by 1, an error generated in the state transition sequence patterns in Table 2 is a 2-bit error, so the error generation probability has been multiplied by 2, and an error generated in the state transition sequence patterns in Table 3 is a 3-bit error, so the error generation probability has been multiplied by 3 respectively. By adding these error rates, the error generation probability of errors generated in all of the state transition sequence patterns in Table 1, state transition sequence patterns in Table 2, and state transition sequence patterns in Table 3 can be determined. If the error generation probability is $bER_{all}$, $bER_{all}$ can be given by the following Expression (24).

$$bER_{all} = bER_{14} + bER_{2A} + bER_{12B} \quad \text{(E24)}$$

The standard deviation computing section 120 converts the bit error rate determined by Expression (24) into a signal index value, to make it to an index which can be handled in a similar manner as jitter.

$$bER_{all} = \frac{p}{2} erfc\left(\frac{1}{2\sqrt{2} \, M}\right) \quad \text{(E25)}$$

Here P is a total of $P_{14}$, $P_{12A}$ and $P_{12B}$, and erfc( ) is an integration value of a complementary error function. If the defining expression of the signal index M according to the present invention is Expression (26), then the index value M can be determined by substituting $bER_{all}$, calculated by Expression (24), in Expression (25).

$$M = \frac{\sigma}{2 \cdot d^2} \quad \text{(E26)}$$

In the above description, a virtual standard deviation $\sigma$ is calculated, and the signal index value M is calculated from a predicted error rate using Expressions (20) to (26). However, the calculation method for the evaluation index M according to the present embodiment is not limited to this method, but may be determined by other defining expressions. An example of other defining expressions will now be described.

A probability of pattern Pa to be detected as pattern Pb is assumed to be the error function given by the following Expression (27).

$$erf_t = \int_{-\infty}^{0} \frac{\exp\{-(x-d^2)^2/2\sigma_t^2\}}{\sqrt{2\pi} \, \sigma_t} dx \quad \text{(E27)}$$

Here t in Expression (27) denotes a pattern number of Tables 1 to 3. d denotes a Euclidean distance in each pattern group in Tables 1 to 3. Specifically, in the case of a pattern group in Table 1, $d^2$ is 14, and in the case of the pattern groups in Table 2 and Table 3, $d^2$ is 12.

The error generation probability in the pattern group in Table 1, the pattern group in Table 2, and the pattern group in Table 3 can be calculated by the following Expression (28) using Expression (27).

$$bER_{all} = 1 \cdot \frac{N_1}{N_1 + N_2 + N_3} \cdot erf_1 + \quad \text{(E28)}$$
$$2 \cdot \frac{N_2}{N_1 + N_2 + N_3} \cdot erf_2 + 3 \cdot \frac{N_3}{N_1 + N_2 + N_3} \cdot erf_3$$

$N_1$, $N_2$ and $N_3$ in Expression (28) are the generation counts of the pattern group defined in Table 1, Table 2 and Table 3 respectively. The difference from Expression (24) is that the error rate of each pattern group is not calculated based on all channels as a parameter, but is based on the number of evaluation patterns in Table 1 to Table 3 as a parameter. Expression (24) calculates an error rate of which parameter is all the channels including the evaluation patterns. Expression (28), on the other hand, calculates the error rate of which parameter is the evaluation patterns. When a virtual σ is calculated based on the error rates calculated by Expression (24) and Expression (28), a same value can be calculated by considering which parameter is the target of σ. Expressions (20) to (26) are examples of computations of which parameters are all channels. The virtual σ is calculated based on Expression (28), and the evaluation index M is calculated. The virtual standard deviation σ can be calculated by the following Expression (29).

$$\sigma = E^{-1}(bER_{all}) \tag{E29}$$

Here $E^{-1}$ denotes an inverse function of Expression (30).

$$E(\sigma) = \left[ \int_{-\infty}^{-1} \frac{1}{\sqrt{2\pi}\,\sigma} \cdot e^{-\frac{x^2}{2\sigma^2}}\, dx \right] \tag{E30}$$

The evaluation index M can be calculated using the following Expression (31), by normalizing with a detected window.

$$M = \frac{\sigma}{2} \tag{E31}$$

In the end, Expression (26) and Expression (31) calculate a virtual σ which is generated in the evaluation patterns defined in Table 1 to Table 3, so the index value M is calculated as substantially a same value. The only difference is the evaluation parameter to calculate the error rate and the notation of the detection window. Either expression may be used to calculate the signal index value M. The calculation of the signal index value M using Expression (31) can also be applied to the first embodiment, of which extraction target is only specific state transition patterns.

Figure 12:
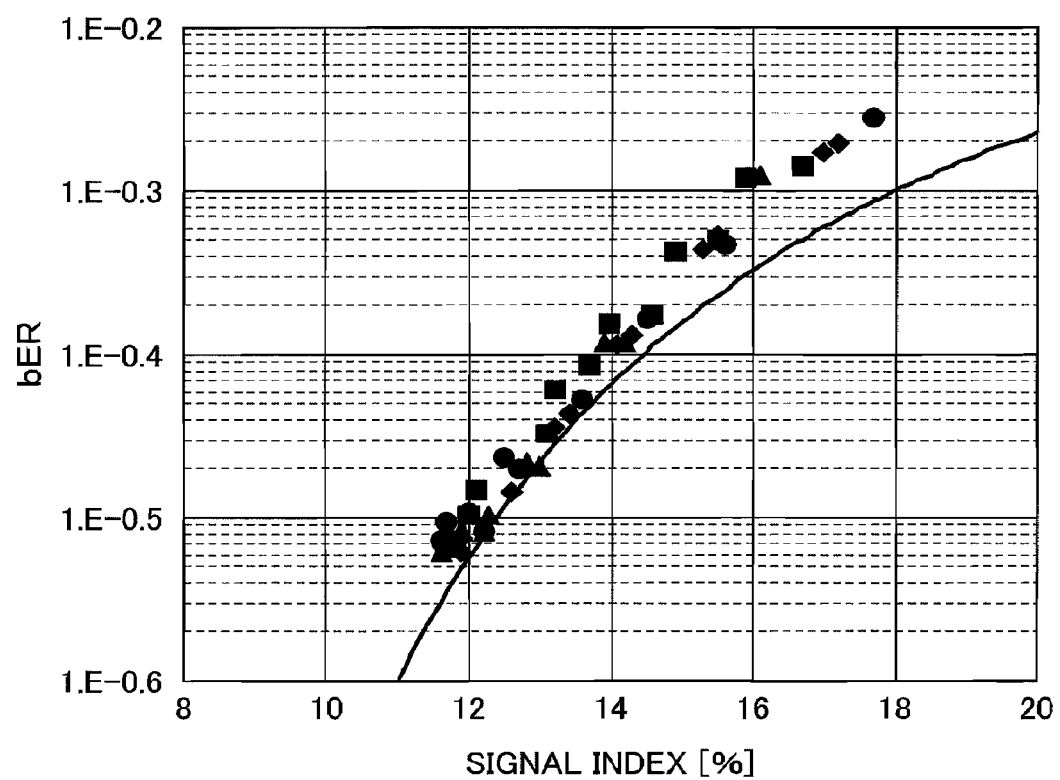
FIG. 12 is a graph depicting a relationship of the signal evaluation index value and error rate according to one embodiment of the present invention.

FIG. 12 is an example of a simulation result showing the bit error rate (bER) and the signal index value % of Expression (18) when reproduction stress, such as tile, defocus and spherical aberration, is applied. In the graph in FIG. 12, ▲ indicates a defocus stress, ● indicates a spherical aberration stress, ♦ indicates a radical tilt stress, and ■ indicates a tangential tilt stress. The solid line in FIG. 12 is a theoretical curve.

Generally the criteria of the system margin is a bER of about 4.0 E-4, so the signal index value to implement this bER is about 15%. As shown in the graph of FIG. 12, the signal index value M, defined in the present embodiment, is matched with the theoretical curve of the error rate in the area of the signal index value≦15%, which is actually used in the system. Therefore the signal evaluation method and index according to the present embodiment are very effective in terms of evaluating signals appropriately.

As described above, according to the present embodiment, state transition sequence patterns of merging paths, of which Euclidean distance in the PRML signal processing is relatively short, are targeted, and one signal evaluation index is generated based on the differential metric information of a plurality of pattern groups, having a different error generation probability and a different number of errors to be generated. Specifically, predicted error rates are calculated from the mean values of the differential metric information, which are not greater than the signal processing threshold of each pattern, the total thereof is calculated, then a virtual standard deviation (hereafter σ) of normal distribution is calculated from the total of error rates, and the signal evaluation index, including this standard deviation σ of the normal distribution, is generated. As a result, it is possible to realize a signal evaluation method and evaluation index having very high correlation with the error rate.

The pre-amplifier section 3, the AGC section 4 and the waveform equalization section 5 in the present embodiment in FIG. 2 may be constructed as one analog integrated circuit (LSI). The pre-amplifier section 3, the AGC section 4, the waveform equalization section 5, the A/D conversion section 6, the PLL section 7, the PR equalization section 8, the maximum likelihood decoding section 9, the signal evaluation index detection section 100, and the optical disk controller section 15 may be consolidated as one analog-digital-mixed integrated circuit (LSI).

In each of the above mentioned embodiments, a case of using the reproduction device as the optical disk device was described. However, needless to say, the optical disk device of the present invention is not limited to this, but can also be applied to a recording/reproduction device. In this case, circuits for recording are added, but description thereof is omitted here, since a known circuit structure can be used.

Third Embodiment

An optical disk device according to still another embodiment of the present invention will now be described with reference to the drawings.

Figure 13:
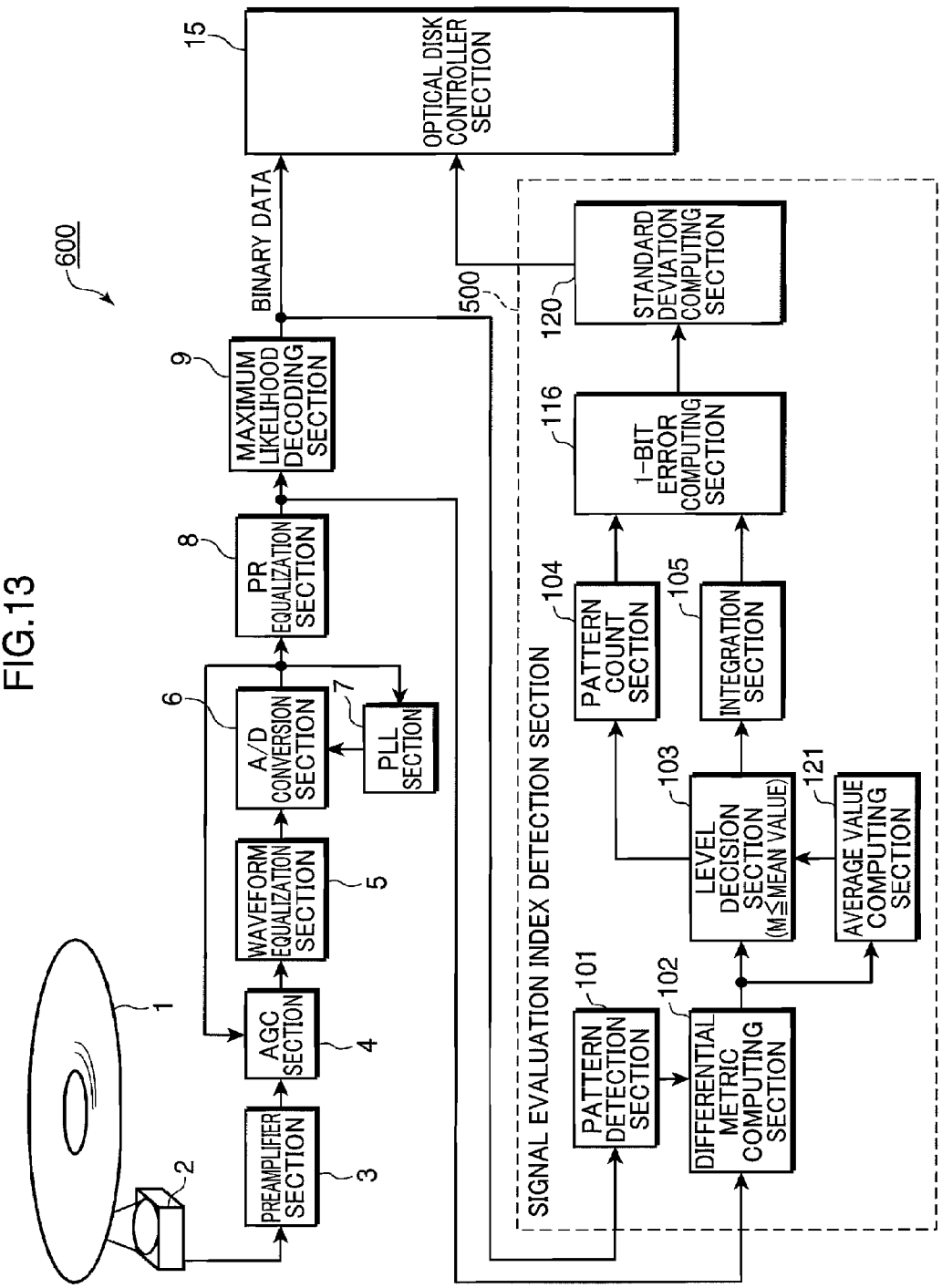
FIG. 13 is a block diagram depicting a structure of an optical disk device according to still another embodiment of the present invention.

FIG. 13 is a block diagram depicting a general structure of the optical disk device of the present embodiment.

The optical disk device 600 has: an optical head section 2, a pre-amplifier section 3, an AGC (Automatic Gain Controller) section 4, a waveform equalization section 5, an A/D conversion section 6, a PLL (Phase Locked Loop) section 7, a PR equalization section 8, a maximum likelihood decoding section 9, a signal evaluation index detection section (reproduction signal evaluation unit) 500 and an optical disk controller section 15. The structures and functions of these composing elements constituting the optical disk device 600 are the same as the first embodiment, and descriptions thereof are omitted here.

The optical disk device 600 according to the present embodiment has a signal evaluation index detection section 500 as the reproduction signal evaluation unit. The signal evaluation index detection section 500 has the same structure as the signal evaluation index detection section 100 of the first embodiment, except for the setting of the signal processing threshold. Hence composing elements having a similar structure and function as the signal evaluation index detection section 100 of the first embodiment are denoted with a same symbol, and description thereof is omitted.

As shown in FIG. 13, the signal evaluation index detection section 500 has a mean value computing section 121 for computing a mean value of outputs of the differential metric computing section 102, in addition to the structure of the first embodiment.

Now the operation of the mean value computing section 121 and how to set the signal processing threshold will be described. In the first embodiment, a predetermined value, that is, a code distance of ideal signals (a square of Euclidean distance between an ideal signal of a most likely first state transition sequence and an ideal signal of a second most likely second state transition sequence in a specific extraction target state transition pattern) is used as the signal processing threshold. This is because in optimized recording, the mean value of outputs of the differential metric computing section matches the code distance of the ideal signals. However, as recording densities of optical disks further improve, recording optimization, to match the mean value with the code distance of the ideal signals, may not be possible in some cases.

Therefore the signal evaluation index detection section 500 of the present embodiment has the mean value computing section 121 for computing a mean value of outputs of the differential metric computing section 102, and inputs this mean value to the level decision section 103 as the signal processing threshold.

According to the foregoing structure, the signal processing threshold can be appropriately set at the center of distribution, which is output from the differential metric computing section 121. Thereby correlation of the signal index value and the bit error rate, when the recording density is increased, can be improved compared with the structure of the first embodiment.

Therefore the structure of the present embodiment, using the mean value of the differential metric distribution as the signal processing threshold, is particularly useful when a high density recording medium is adopted as the information recording medium 1.

Fourth Embodiment

An optical disk device according to still another embodiment of the present invention will now be described with reference to the drawings.

Figure 14:
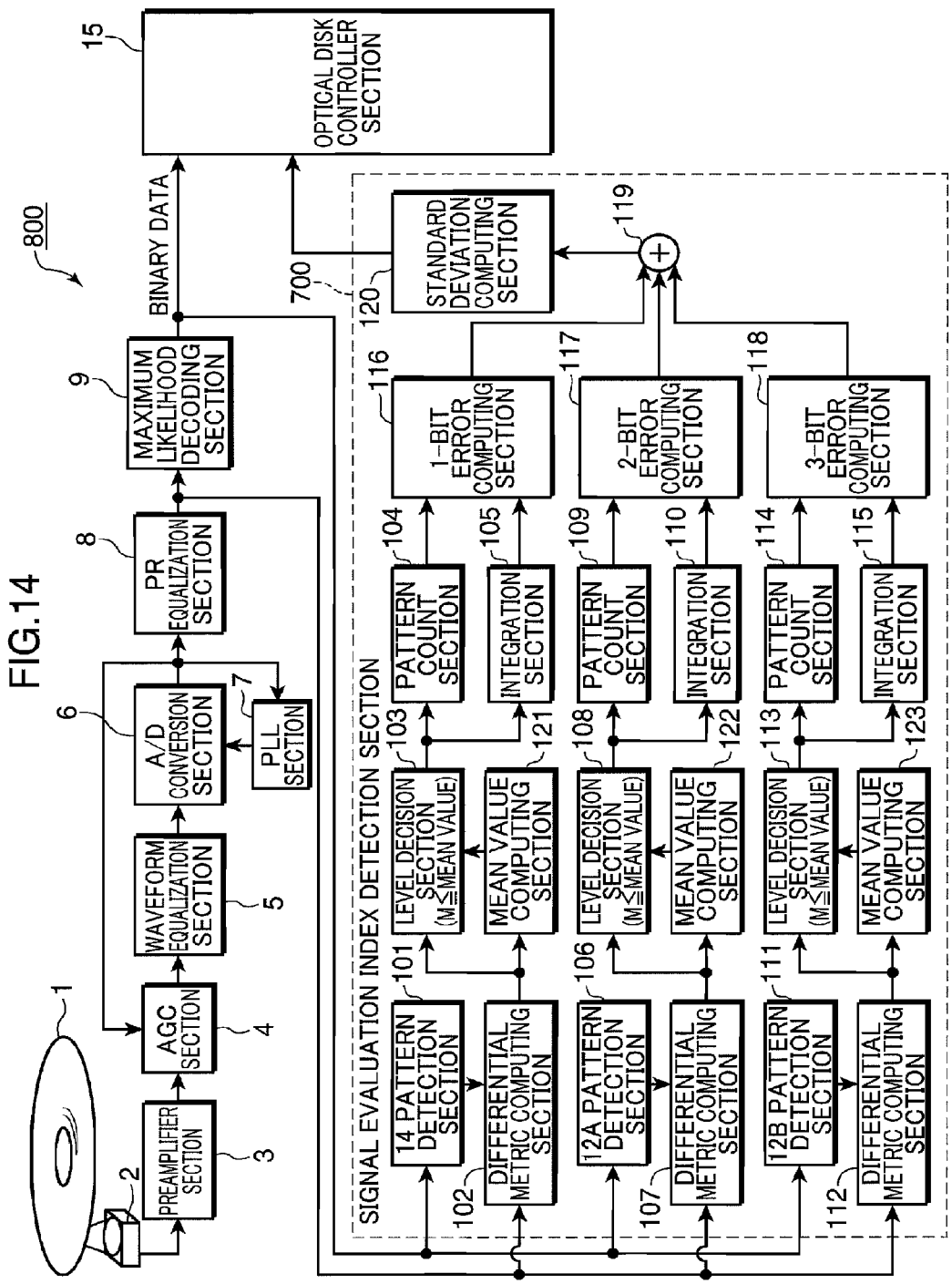
FIG. 14 is a block diagram depicting a structure of an optical disk device according to still another embodiment of the present invention.
Figure 15A:
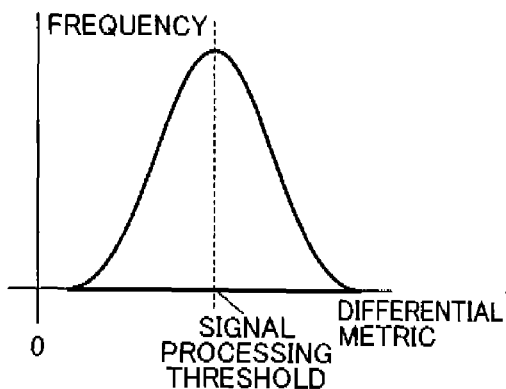
FIG. 15A is a diagram depicting the distribution of a conventional differential metric.
Figure 15D:
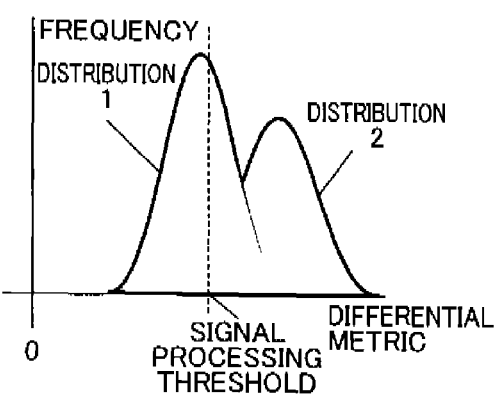
FIG. 15D is a diagram depicting the distribution of a conventional differential metric.
Figure 15B:
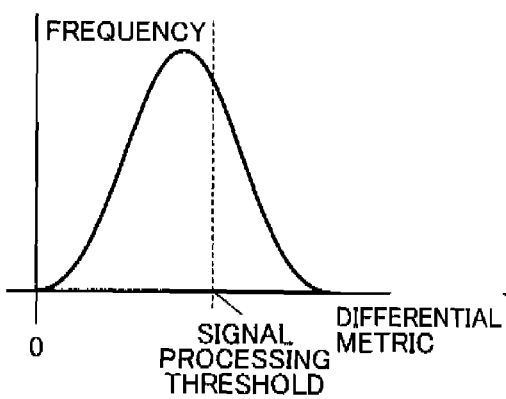
FIG. 15B is a diagram depicting the distribution of a conventional differential metric.
Figure 15E:
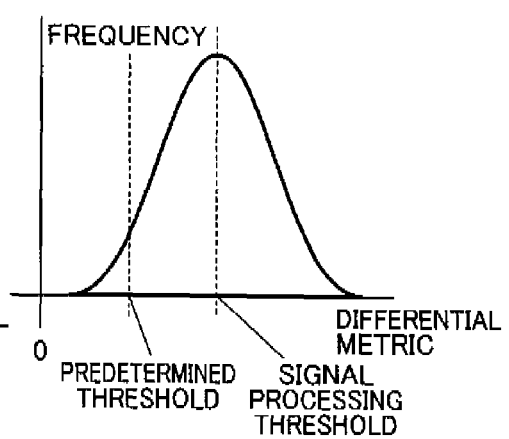
FIG. 15E is a diagram depicting the distribution of a conventional differential metric.
Figure 15C:
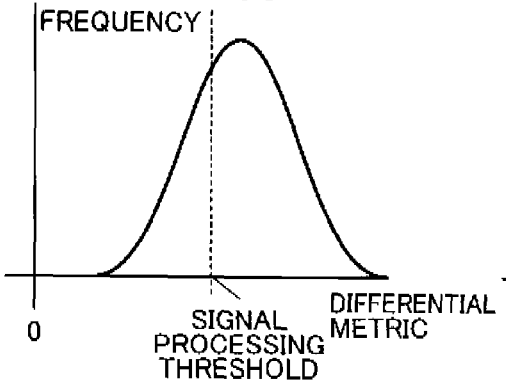
FIG. 15C is a diagram depicting the distribution of a conventional differential metric.
Figure 15F:
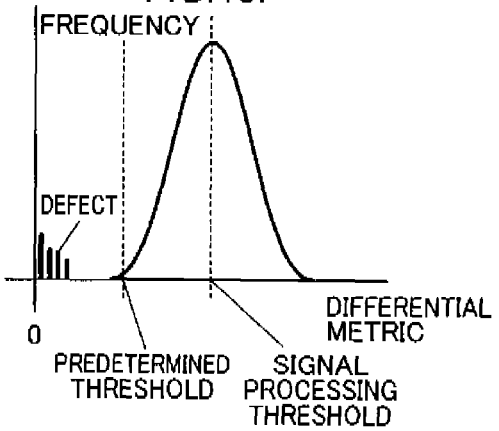
FIG. 15F is a diagram depicting the distribution of a conventional differential metric.

FIG. 14 is a block diagram depicting the general structure of the optical disk device of the present invention.

The optical disk device 800 has an optical head section 2, a preamplifier section 3, an AGC (Automatic Gain Controller) section 4, a waveform equalization section 5, an A/D conversion section 6, PLL (Phase Locked Loop) section 7, a PR equalization section 8, a maximum likelihood decoding section 9, a signal evaluation index detection section (reproduction signal evaluation unit) 700 and an optical disk controller section 15. The structure and function of these composing elements constituting the optical disk device 800 are the same as the second embodiment, so description thereof is omitted here.

The optical disk device 800 according to the present embodiment has a signal evaluation index detection section 700 as the reproduction signal evaluation unit 700. The signal evaluation index detection section 700 has the same structure as the signal evaluation index detection section 300 of the second embodiment, except for the setting of the signal processing threshold. Hence a composing element having a similar structure and function as the signal evaluation index detection section 300 of the second embodiment is denoted with a same symbol, and description thereof is omitted.

As shown in FIG. 14, the signal evaluation index detection section 700 has mean value computing sections 121, 122 and 123 for computing a respective mean value of the outputs of the differential metric computing sections 102, 107 and 112, in addition to the structure of the second embodiment.

Now operation of the mean value computing sections 121, 122 and 123, and how to set the signal processing threshold will be described. In the third embodiment, a predetermined value, that is, a code distance of ideal signals (a square of Euclidean distance between an ideal signal of a most likely first state transition sequence and an ideal signal of a second most likely second state transition sequence in each extraction target state transition pattern), is used as the signal processing threshold. This is because in optimized recording, the mean value of outputs of the differential metric computing section matches the code distance of ideal signals. However, as the recording densities of optical disks further improve, recording optimization to match the mean value with the code distance of the ideal signals may not be possible in some cases.

Therefore the signal evaluation index detection section 700 of the present embodiment has the mean value computing sections 121, 122 and 123 for computing a respective mean value of outputs of the differential metric computing sections 102, 107 and 112, and inputs this mean value to the level decision sections 103, 108 and 113 as the signal processing threshold respectively.

According to the foregoing structure, the signal processing threshold can be appropriately set at the center of distribution, which is output from each of the differential metric computing sections 121, 122 and 123. Thereby correlation of the signal index value and the bit error rate when the recording density is increased can be improved compared with the structure of the first embodiment.

Therefore the structure of the present embodiment, using the mean value of the differential metric distribution as the signal processing threshold, is particularly useful when a high density recording medium is adopted as the information recording medium 1.

As described above, the reproduction signal evaluation method according to one aspect of the present invention is a reproduction signal evaluation method for evaluating quality of a reproduction signal reproduced from an information recording medium based on a binary signal generated from the reproduction signal using a PRML signal processing system, comprising: a pattern extraction step of extracting, from the binary signal, a specific state transition pattern which has the possibility of causing a bit error; a differential metric computing step of computing a differential metric, which is a difference of a first metric between an ideal signal of a most likely first state transition sequence corresponding to the binary signal and the reproduction signal, and a second metric between an ideal signal of a second most likely second state transition sequence corresponding to the binary signal and the reproduction signal, based on the binary signal of the state transition pattern extracted in the pattern extraction step; an extraction step of extracting the differential metric which is not greater than a predetermined signal processing threshold; a mean value computing step of determining a mean value of the differential metrics which are not greater than the predetermined signal processing threshold and extracted in the extraction step; a standard deviation computing step of determining a standard deviation which corresponds to an error rate predicted from the mean value; and an evaluation step of evaluating a quality of the reproduction signal using the standard deviation.

According to the foregoing method, specific state transition patterns which have the possibility of causing a bit error are extracted from the binary signals generated by reproducing the information recording medium. Here the state transition pattern which has a possibility of causing a bit error is a state transition pattern having merging paths which could take a plurality of state transitions when a predetermined state at a certain time transits to a predetermined state at another time, and is a state transition pattern of merging paths of which Euclidean distance between an ideal signal of a most likely first state transition sequence and an ideal signal of a second most likely second state transition sequence is relatively short. If there are a plurality of state transition patterns which have the possibility of causing a bit error, a specific state transition pattern is selectively extracted.

Targeting the binary signal of the extracted specific state transition pattern, a differential metric, which is a difference of "a first metric between an ideal signal of a most likely first state transition sequence corresponding to this binary signal and the above mentioned reproduction signal", and "a second metric between an ideal signal of a second most likely second state transition sequence corresponding to this binary signal and the above mentioned reproduction signal", is calculated. Here the first metric is a square of the Euclidean distance between the ideal signal of the first state transition sequence and the reproduction signal, and the second metric is a square of the Euclidean distance between the ideal signal of the second state transition sequence and the reproduction signal.

Of the calculated differential metrics, only those not greater than a predetermined signal processing threshold are selectively extracted. In other words, an area in which the differential metrics are great do not contribute to error generation, so an area in which the calculated differential metrics are greater than the signal processing threshold is eliminated as an unnecessary area to predict the error rate. Further, by limiting the target to predict the error rate to differential metrics which are not greater than the signal processing threshold, error rate prediction accuracy is improved.

A standard deviation, which corresponds to the error rate to be predicted, is then determined from the mean value of the above mentioned extracted differential metrics which are not greater than the signal processing threshold, and the quality of the reproduction signal is evaluated using this standard deviation, hence signal evaluation having very high correlation with the error rate becomes possible. As a result, a reproduction signal evaluation method, which is suitable for a system using a PRML signal processing system and which can evaluate the quality of the reproduction signal of the information recording medium at high accuracy, can be implemented.

It is preferable that the signal processing threshold is a square of a Euclidean distance between the ideal signal of the most likely first state transition sequence and the ideal signal of the second most likely second state transition sequence.

According to the foregoing structure, the signal processing threshold corresponding to the extraction target specific state transition patterns can be accurately set so as to match with the Euclidean distance between the ideal signal of the first state transition sequence and the ideal signal of the second state transition sequence. This is particularly effective to evaluate signals where a plurality of state transition patterns, which have the possibility of generating an error, are mixed.

It is preferable that the foregoing method further comprises a threshold computing step of setting a computed value, acquired by averaging the differential metrics calculated in the differential metric computing step, as the signal processing threshold.

According to this method, a signal processing threshold according to extraction target predetermined state transmission patterns is determined by averaging the differential metrics calculated in the differential metric computing step. Therefore a signal processing threshold suitable for actual reproduction signals of the information recording medium can be acquired each time. As a result, a more accurate predicted error rate can be determined, and furthermore an appropriate quality evaluation of reproduction signals of information recording media becomes possible.

The reproduction signal evaluation method according to another aspect of the present invention is a reproduction signal evaluation method for evaluating quality of a reproduction signal reproduced from an information recording medium based on a binary signal generated from the reproduction signal using a PRML signal processing system, comprising: a plurality-of-patterns extraction step of extracting, from the binary signal, a plurality of state transition patterns, which have the possibility of causing a bit error; a differential metric computing step of computing a differential metric, which is a difference of a first metric between an ideal signal of a most likely first state transition sequence corresponding to the binary signal and the reproduction signal, and a second metric between an ideal signal of a second most likely second state transition sequence corresponding to the binary signal and the reproduction signal, based on the binary signal respectively, for each state transition pattern extracted in the plurality-of-patterns extraction step; an extraction step of extracting, for each state transition pattern, the differential metrics which are not greater than a predetermined signal processing threshold, which is set for each of the plurality of state transition patterns; a mean value computing step of determining, for each state transition pattern, a mean value of the differential metrics which are not greater than the signal processing threshold and extracted in the extraction step; an error rate computing step of determining, for each state transition pattern, an error rate predicted based on the mean value; a standard deviation computing step of determining a standard deviation which corresponds to a sum of the error rate of each state transition pattern; and an evaluation step of evaluating a quality of the reproduction signal using the standard deviation.

According to the foregoing structure, a plurality of state transition patterns which have the possibility of causing a bit error are extracted from the binary signal generated by reproducing the information recording medium. And differential metrics are calculated for each of the extracted state transition patterns, and only the differential metrics which are not greater than a predetermined signal processing threshold are selectively extracted. In other words, an area in which the calculated differential metrics are greater than the signal processing threshold is eliminated as an unnecessary area to predict the error rate, and by limiting the target to predict the error rate only to differential metrics which are not greater than the signal processing threshold, error rate prediction accuracy is improved. Then an error rate predicted from the mean value of differential metrics which are not greater than the signal processing threshold is determined for each state transition pattern respectively. Then a standard deviation, which corresponds to the sum of the error rate of each state transition pattern, is determined, and the quality of a reproduction signal is evaluated using this standard deviation, hence signal evaluation having very high correlation with the error rate becomes possible. As a result, a reproduction signal evaluation method, which is suitable for a system using the PRML signal processing system and which can evaluate the quality of the reproduction signal of the information recording medium at high accuracy, can be implemented.

It is preferable that the plurality-of-patterns extraction step extracts state transition patterns of the binary signal for which a square of a Euclidean distance between the ideal signal of the most likely first state transition sequence and the ideal signal of the second most likely second state transition sequence is not greater than 14.

According to the foregoing structure, a state transition pattern which has the possibility of causing a bit error is a state transition pattern having merging paths which could take a plurality of state transitions when a predetermined state at a certain time transits to a predetermined state at another time, and is a state transition pattern of merging paths of which Euclidean distance between an ideal signal of a most likely first state transition sequence and an ideal signal of a second most likely second state transition sequence is relatively short. The state transition pattern of which square of the Euclidean distance is not greater than 14 is a pattern which has a very high possibility of causing a bit error, and by targeting only such state transition patterns for extraction, error rate can be efficiently predicted at high accuracy, and appropriate quality evaluation for the reproduction signals of the information recording medium can be implemented.

It is preferable that the PRML signal processing system is a PR12221 system.

In this way, if the reproduction signal evaluation method is applied to a system using PR12221, the quality of the reproduction signal of the information recording medium can be evaluated at high accuracy.

The reproduction signal evaluation unit according to another aspect of the present invention is a reproduction signal evaluation unit for evaluating quality of a reproduction signal reproduced from an information recording medium based on a binary signal generated from the reproduction signal using a PRML signal processing system, comprising: a pattern extraction section for extracting, from the binary signal, a specific state transition pattern which has the possibility of causing a bit error; a differential metric computing section for computing a differential metric, which is a difference of a first metric between an ideal signal of a most likely first state transition sequence corresponding to the binary signal and the reproduction signal, and a second metric between an ideal signal of a second most likely second state transition sequence corresponding to the binary signal and the reproduction signal, based on the binary signal of the state transition pattern extracted by the pattern extraction section; an extraction section for extracting the differential metric which is not greater than a predetermined signal processing threshold; a mean value computing section for determining a mean value of the differential metrics which are not greater than the signal processing threshold and extracted by the extraction section; and a standard deviation computing section for determining a standard deviation which corresponds to an error rate predicted based on the mean value.

According to the foregoing structure, a standard deviation, which corresponds to the error rate to be predicted based on the mean value of the differential metrics, which are not greater than the extracted signal processing threshold, is determined, and the quality of the reproduction signal is evaluated using this standard deviation. Hence signal evaluation having very high correlation with the error rate becomes possible. As a result, a reproduction signal evaluation unit, which is suitable for a system using the PRML signal processing system and which can evaluate the quality of the reproduction signal of the information recording medium at high accuracy, can be implemented.

It is preferable that the signal processing threshold is a square of a Euclidean distance between the ideal signal of the most likely first state transition sequence and the ideal signal of the second most likely second state transition sequence.

According to the foregoing structure, the signal processing threshold corresponding to the extraction target specific state transition patterns can be accurately set so as to match with the Euclidean distance between the ideal signal of the first state transition sequence and the ideal signal of the second state transition sequence. This is particularly effective to evaluate signals where a plurality of state transition patterns, which have the possibility of generating an error, are mixed.

It is preferable that the foregoing structure further comprises a threshold computing section for setting a computed value, acquired by averaging the differential metrics calculated by the differential metric computing section, as the signal processing threshold.

According to the foregoing structure, a signal processing threshold according to the extraction target specific state transition pattern is determined by averaging the differential metrics calculated by the differential metric computing section. Therefore a signal processing threshold suitable for actual reproduction signals of the information recording medium can be acquired each time. As a result, a more accurate predicted error rate can be determined, and furthermore, an appropriate quality evaluation of reproductive signals of information recording media can be implemented.

The reproduction signal evaluation unit according to another aspect of the present invention is a reproduction signal evaluation unit for evaluating quality of a reproduction signal reproduced from an information recording medium based on a binary signal generated from the reproduction signal using a PRML signal processing system, comprising: a pattern extraction section for extracting, from the binary signal, a plurality of state transition patterns which have the possibility of causing a bit error; a differential metric computing section for computing a differential metric, which is a difference of a first metric between an ideal signal of a most likely first state transition sequence corresponding to the binary signal and the reproduction signal, and a second metric between an ideal signal of a second most likely second state transition sequence corresponding to the binary signal and the reproduction signal, based on the binary signal respectively, for each state transition pattern extracted by the pattern extraction section; an extraction section for extracting, for each state transition pattern, the differential metrics which are not greater than a predetermined signal processing threshold, which is set for each of the plurality of state transition patterns; a mean value computing section for determining, for each state transition pattern, a mean value of the differential metrics which are not greater than the predetermined signal processing threshold and extracted by the extraction section; an error rate computing section for determining, for each state transition pattern, an error rate predicted based on the mean value; and a standard deviation computing section for determining a standard deviation which corresponds to a sum of the error rate of each state transition pattern.

According to the foregoing structure, a standard deviation which corresponds to a sum of the error rate of each state transition pattern, is determined and the quality of the reproduction signal is evaluated using this standard deviation. Hence a signal evaluation having very high correlation with the error rate becomes possible. As a result, a reproduction signal evaluation device, which is suitable for a system using the PRML signal processing system and which can evaluate quality of the reproduction signal of the information recording medium at high accuracy, can be implemented.

It is preferable that the pattern extraction section extracts patterns of the binary signal for which a square of a Euclidean distance between the ideal signal of the most likely first state transition sequence and the ideal signal of the second most likely second state transition sequence is not greater than 14.

It is preferable that the PRML signal processing system is a PR12221 system.

A disk device according to another aspect of the present invention comprises a reproduction section for generating a binary signal from a reproduction signal reproduced from an optical disk, that is an information recording medium, using a PRML signal processing system; and the reproduction signal evaluation unit according to each of the above mentioned structures.

The present invention is particularly useful in technical fields in which signal processing is performed using the maximum likelihood decoding method.

This application is based on U.S. Provisional Application No. 61/129,510 filed on Jul. 1, 2008, the contents of which are hereby incorporated by reference.

Specific embodiments or examples used for the detailed description of the invention are merely for clarifying the technical content of the present invention, and the present invention should not be interpreted within these limited examples, but can be modified in various ways within the spirit of the present invention and scope of the claims described herein below.

What is claimed is:

1. A reproduction signal evaluation method for evaluating quality of a reproduction signal reproduced from an information recording medium based on a binary signal generated from the reproduction signal using a Partial Response Maximum Likelihood (PRML) signal processing system, the reproduction signal evaluation method comprising:

a plurality-of-patterns extraction step of extracting, from the binary signal, a plurality of state transition patterns, which have a possibility of causing a bit error;

a differential metric computing step of computing a differential metric, which is a difference of a first metric between an ideal signal of a most likely first state transition sequence corresponding to the binary signal and the reproduction signal, and a second metric between an ideal signal of a second most likely second state transition sequence corresponding to the binary signal and the reproduction signal, based on the binary signal respectively, for each state transition pattern extracted in the plurality-of-patterns extraction step;

a low range extraction step of extracting, for each state transition pattern, differential metrics which are not greater than a predetermined signal processing threshold, which is set for each of the plurality of state transition patterns;

a low range extraction counting step of counting the number of extractions in the low range extraction step as a count value;

an error rate computing step of determining, for each state transition pattern, an error rate predicted based on an integrated value of the differential metrics extracted in the low range extraction step and the count value counted in the low range extraction counting step;

a standard deviation computing step of determining a standard deviation which corresponds to a sum of the error rate of each state transition pattern; and an evaluation step of evaluating a quality of the reproduction signal using the standard deviation, wherein the plurality-of-patterns extraction step extracts state transition patterns of the binary signal for which a square of a Euclidean distance between the ideal signal of the most likely first state transition sequence and the ideal signal of the second most likely second state transition sequence is not greater than 14.

2. A reproduction signal evaluation method for evaluating quality of a reproduction signal reproduced from an information recording medium based on a binary signal generated from the reproduction signal using a Partial Response Maximum Likelihood (PRML) signal processing system, the reproduction signal evaluation method comprising:

a plurality-of-patterns extraction step of extracting, from the binary signal, a plurality of state transition patterns, which have a possibility of causing a hit error;

a differential metric computing step of computing a differential metric, which is a difference of a first metric between an ideal signal of a most likely first state transition sequence corresponding to the binary signal and the reproduction signal, and a second metric between an ideal signal of a second most likely second state transition sequence corresponding to the binary signal and the reproduction signal, based on the binary signal respectively, for each state transition pattern extracted in the plurality-of-patterns extraction step;

a low range extraction step of extracting, for each state transition pattern, differential metrics which are not greater than a predetermined signal processing threshold, which is set for each of the plurality of state transition patterns;

a low range extraction counting step of counting the number of extractions in the low range extraction step as a count value;

an error rate computing step of determining, for each state transition pattern, an error rate predicted based on an integrated value of the differential metrics extracted in the low range extraction step and the count value counted in the low range extraction counting step;

a standard deviation computing step of determining a standard deviation which corresponds to a sum of the error rate of each state transition pattern; and an evaluation step of evaluating a quality of the reproduction signal using the standard deviation, wherein the PRML signal processing system is a PR12221 system.

3. A reproduction signal evaluation unit for evaluating quality of a reproduction signal reproduced from an information recording medium based on a binary signal generated from the reproduction signal using a Partial Response Maximum Likelihood (PRML) signal processing system, the reproduction signal evaluation unit comprising:

a pattern extraction section for extracting, from the binary signal, a plurality of state transition patterns which have a possibility of causing a bit error;

a differential metric computing section for computing a differential metric, which is a difference of a first metric between an ideal signal of a most likely first state transition sequence corresponding to the binary signal and the reproduction signal, and a second metric between an ideal signal of a second most likely second state transition sequence corresponding to the binary signal and the reproduction signal, based on the binary signal respectively, for each state transition pattern extracted by the pattern extraction section;

a low range extraction section for extracting, for each state transition pattern, differential metrics which are not greater than a predetermined signal processing threshold, which is set for each of the plurality of state transition patterns;

a low range extraction counting section for counting the number of extractions by the low range extraction section as a count value;

an error rate computing section for determining, for each state transition pattern, an error rate predicted based on an integrated value of the differential metrics extracted by the low range extraction section and the count value counted by the low range extraction counting section; and a standard deviation computing section for determining a standard deviation which corresponds to a sum of the error rate of each state transition pattern, wherein the pattern extraction section extracts patterns of the binary signal for which a square of a Euclidean distance between the ideal signal of the most likely first state transition sequence and the ideal signal of the second most likely second state transition sequence is not greater than 14.

4. An optical disk device, comprising:
- a reproduction section for generating a binary signal from a reproduction signal reproduced from an optical disk, that is an information recording medium, using a PRML signal processing system; and
- the reproduction signal evaluation unit according to claim 3.

5. A reproduction signal evaluation unit for evaluating quality of a reproduction signal reproduced from an information recording medium based on a binary signal generated from the reproduction signal using a partial response maximum likelihood Partial Response Maximum Likelihood (PRML) signal processing system, the reproduction signal evaluation unit comprising:
- a pattern extraction section for extracting, from the binary signal, a plurality of state transition patterns which have a possibility of causing a bit error;
- a differential metric computing section for computing a differential metric, which is a difference of a first metric between an ideal signal of a most likely first state transition sequence corresponding to the binary signal and the reproduction signal, and a second metric between an ideal signal of a second most likely second state transition sequence corresponding to the binary signal and the reproduction signal, based on the binary signal respectively, for each state transition pattern extracted by the pattern extraction section;
- a low range extraction section for extracting, for each state transition pattern, differential metrics which are not greater than a predetermined signal processing threshold, which is set for each of the plurality of state transition patterns;
- a low range extraction counting section for counting the number of extractions by the low range extraction section as a count value;
- an error rate computing section for determining, for each state transition pattern, an error rate predicted based on an integrated value of the differential metrics extracted by the low range extraction section and the count value counted by the low range extraction counting section; and
- a standard deviation computing section for determining a standard deviation which corresponds to a sum of the error rate of each state transition pattern, wherein the PRML signal processing system is a PR 12221 system.

\* \* \* \* \*